United States Patent [19]

Fujisawa et al.

[11] Patent Number: 5,322,743
[45] Date of Patent: Jun. 21, 1994

[54] SLIDE MEMBER

[75] Inventors: Yoshikazu Fujisawa; Makoto Tsuji; Takeshi Narishige, all of Saitama, Japan

[73] Assignee: Honda Giken Kogyo Kabushiki Kaisha, Tokyo, Japan

[21] Appl. No.: 60,957

[22] Filed: May 12, 1993

Related U.S. Application Data

[62] Division of Ser. No. 891,939, Jun. 1, 1992.

[30] Foreign Application Priority Data

| May 31, 1991 | [JP] | Japan | 3-156162 |
| Jun. 7, 1991 | [JP] | Japan | 3-162525 |
| Jun. 7, 1991 | [JP] | Japan | 3-162526 |
| Jul. 2, 1991 | [JP] | Japan | 3-187048 |
| Jul. 2, 1991 | [JP] | Japan | 3-187049 |

[51] Int. Cl.$^5$ .............................................. F16C 33/12
[52] U.S. Cl. ................................... 428/687; 428/935; 384/912
[58] Field of Search ............... 428/643, 644, 645, 687, 428/935; 384/912, 913

[56] References Cited

U.S. PATENT DOCUMENTS

| 2,586,100 | 2/1952 | Schultz | 428/645 |
| 4,470,184 | 9/1984 | Fukuoka et al. | 384/913 |
| 4,937,149 | 6/1990 | Mori | 428/650 |

FOREIGN PATENT DOCUMENTS

| 3524412 | 1/1987 | Fed. Rep. of Germany . |
| 750557 | 6/1956 | United Kingdom . |
| 1240885 | 7/1971 | United Kingdom . |
| 1295997 | 11/1972 | United Kingdom . |
| 2084191 | 4/1982 | United Kingdom . |
| 2117403 | 10/1983 | United Kingdom . |
| 2240343 | 7/1991 | United Kingdom . |

OTHER PUBLICATIONS

G. Roventi et al; "Electrodeposition of lead Alleye from fluoburoate baths", Journal of Applied Electrochemistry 14 (1984) 505–510.
Handbuch Der Galvanotechnik-Dr. H. Dettner & Dr. J. Elze (Munchem 1963).
Galvanotechnisches Fachwissen S. 97–101, 1982, (A. Strauch).
Metallurgical Coatings 1988 (R. C. Krutenat), vol. 36, Nos. 3–4.

Primary Examiner—John Zimmerman
Attorney, Agent, or Firm—Lyon & Lyon

[57] ABSTRACT

A slide member includes a surface layer having a slide surface for a mating member. The surface layer has a plurality of pyramid-shaped projections protruding from a phantom plane thereby defining the slide surface along the phantom plane. The percent area A of the pyramid-shaped projections occupied in the slide surface is in a range of $A \geq 50\%$. The inclination angle $\theta$ of the pyramid-shaped projection formed by a line passing through its apex and the central portion of its base surface with respect to a reference line perpendicular to the phantom plane is in a range of $0° \leq \theta \leq 30°$.

8 Claims, 38 Drawing Sheets

5μm

1μm

5μm

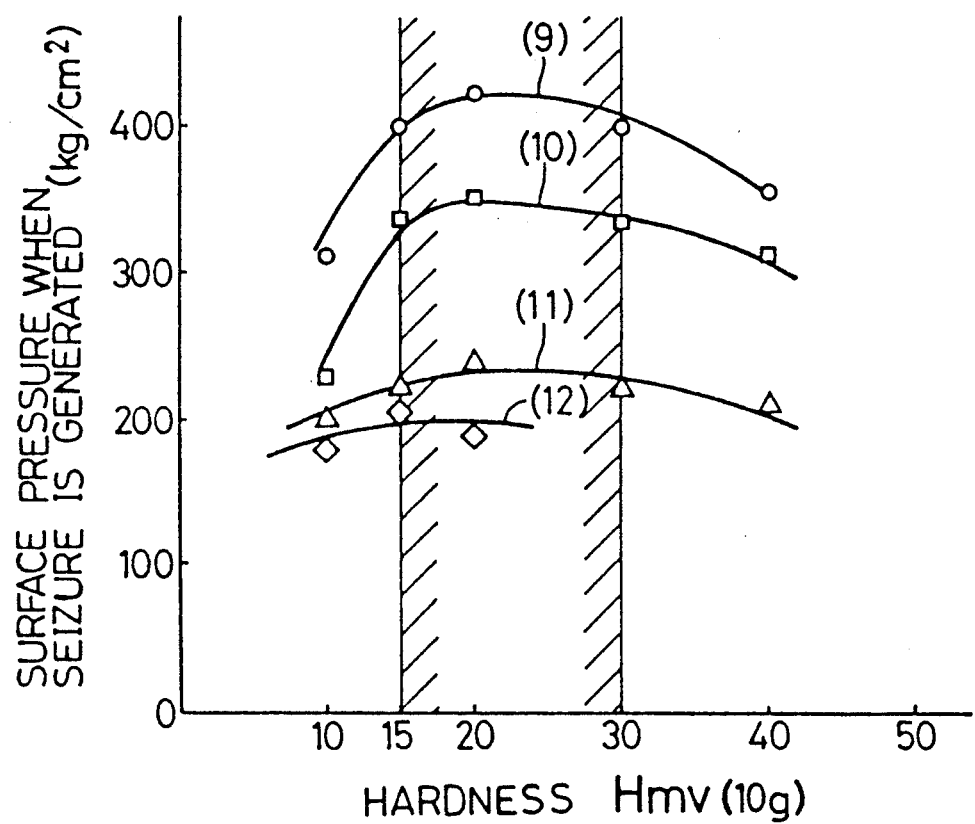

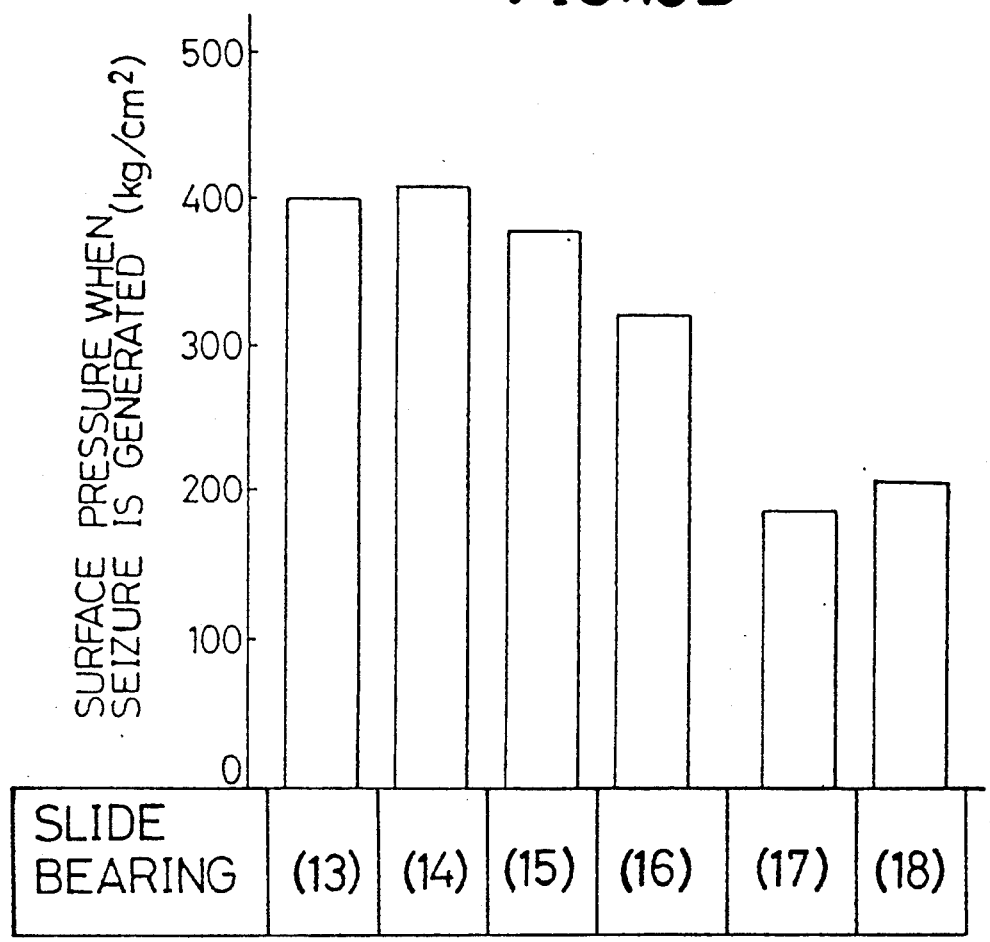

10μm

10μm

SLIDE MEMBER

This application is a divisional application of U.S. Ser. No. 07/891,969, filed Jun. 1, 1992, pending.

BACKGROUND OF THE SPECIFICATION

1. Field of the Invention

This invention relates to a slide member and more particularly, to a slide member including a surface layer having a slide surface for a mating member.

2. Description of the Prior Art

There are conventionally known slide bearings as a slide member of such type, comprising a surface layer formed of Pb-Sn based alloy (see Japanese Patent Application Laid-open No. 96088/81).

Such a slide bearing has been applied to a journal portion of a crankshaft in an engine, an enlarged end of a connecting rod or the like. Under existing circumstances where there is a tendency of requiring an increased speed and increased output of an engine, however, prior art slide bearings suffer from a problem that an oil retention property on the slide surface layer thereof is insufficient and their seizure resistance thereof is also poor due to an inferior initial conformability.

SUMMARY OF THE INVENTION

It is an object of the present invention to provide a slide member of the type described above, wherein a sufficient oil retention property is achieved on the surface layer and the initial conformability of the surface layer can be improved by specifying the structure of the surface layer, thereby providing an increased seizure resistance of the surface layer.

It is another object of the present invention to provide a slide member of the type described above, wherein the hardness of the surface layer is increased to provide increased seizure and wear resistances.

To achieve the above objects, according to the present invention, there is provided a slide member comprising a surface layer having a slide surface for a mating member, wherein the surface layer has a plurality of pyramid-shaped projections defining the slide surface and protruding from a phantom plane extending along the slide surface; a percent area A of the pyramid-shaped projections occupied in the slide surface is equal to or more than 50% (A≧50%); and wherein when an inclination angle formed by a straight line passing an apex and a central portion of a base face of the pyramid-shaped projection with respect to a reference line perpendicular to the phantom plane is represented by $\theta$, the inclination angle $\theta$ of the pyramid-shaped projection is in a range of $0° \leq \theta \leq 30°$.

If the percent area A and the inclination angle $\theta$ of the pyramid-shaped projections are specified in the above manner, the surface area of the slide surface is increased to provide a sufficient oil retention property, and the apex portion of each projection can be preferentially worn out to improve an initial conformability of the surface layer, thereby enhancing the seizure resistance of the surface layer.

In addition, according to the present invention, there is provided a slide member wherein the projections are provided around a base face thereof with a protrusion piece for permitting oil to be retained temporarily, or adjacent projections are interconnected by a blocking piece for permitting oil to be retained temporarily between these projections.

With such configuration, the oil retention property of the surface layer can be further improved.

Further, according to the present invention, there is provided a slide member wherein each of the projections forms a tip end of a columnar crystal, and one adjacent columnar crystals bites into another.

The adjacent columnar crystals in such a biting state have an increased internal stress and thus show a high hardness, thereby providing an improved wear resistance of the surface layer.

Yet further, according to the present invention, there is provided a slide member wherein the projections are aggregated together to form a matrix, and a plurality of massive portions are dispersed in the matrix and each have at least one group of pyramid-shaped projecting portions and truncated-pyramid-shaped projection portions projecting substantially radiately on the surface thereof.

With such a configuration, the surface area of the slide surface is increased more than the case wherein only the projections are provided, and therefore, the oil retention property of the surface layer can be further improved.

Further, according to the present invention, there is provided a slide member wherein a projection is formed into a star-like shape having a plurality of ridgeline portions extending from an apex toward a base portion, with slants between adjacent ridgeline portions being recessed.

With such a configuration, the surface area of the slide surface is increased due to the projections being formed into a substantially star-like shape with the slants recessed, thereby enabling the surface layer to have a sufficient oil retention property.

The above and other objects, features and advantages of the invention will become apparent from a consideration of the following description of the preferred embodiments, taken in conjunction with the accompanying drawings.

BRIEF DESCRIPTION OF THE DRAWINGS

FIG. 15A is a graph illustrating a relationship between the hardness and the surface pressure when seizure is generated;

FIG. 15B is a graph illustrating results of a seizure test;

DESCRIPTION OF THE PREFERRED EMBODIMENTS

FIGS. 1 to 18 illustrate a first embodiment of the present invention.

Figure 1:
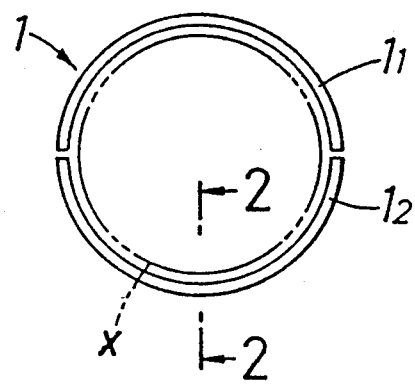
FIG. 1 is an exploded plan view of a slide bearing.
Figure 2:
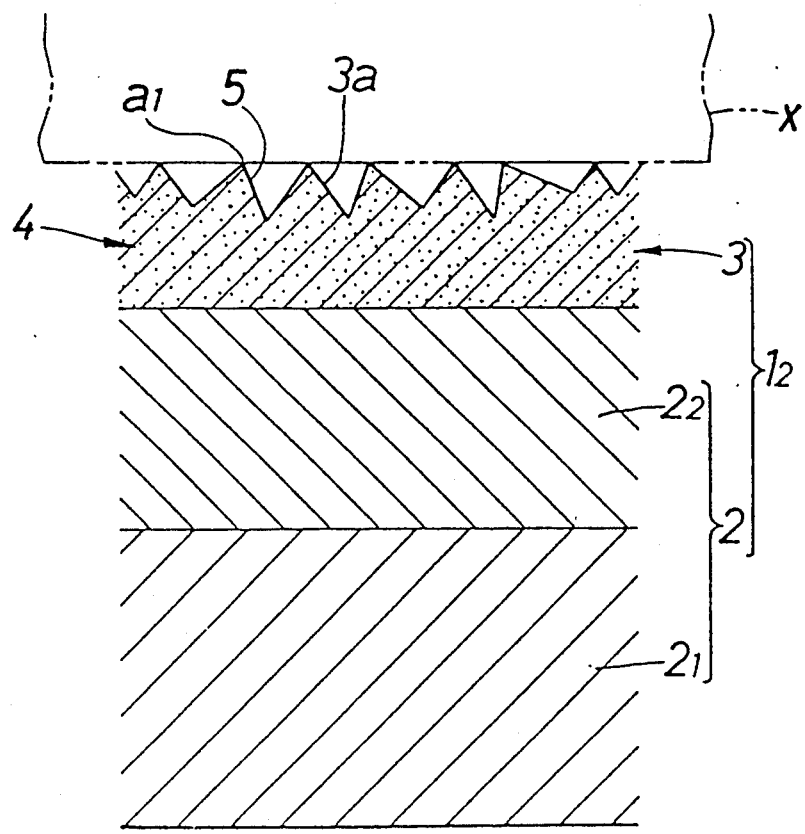
FIG. 2 is a sectional view taken along a line 2—2 in FIG. 1.

Referring to FIGS. 1 and 2, a slide bearing 1 as a slide member is applied to a journal portion of a crankshaft in an engine, an enlarged end of a connecting rod or the like and comprises a first half $1_1$ and a second half $1_2$. The halves $1_1$ and $1_2$ have the same configuration and each includes a base 2 and a surface layer formed on an inner peripheral surface of the base 2 and having a slide surface $3a$ for a mating member x. The base 2 has a backing $2_1$ and a lining layer $2_2$ formed on the backing $2_1$ to bear the surface layer 3. Optionally, a Cu deposit layer may be provided between the backing $2_1$ and the lining layer $2_2$, and a Ni deposit barrier layer may be provided between the lining layer $2_2$ and the surface layer 3.

The backing $2_1$ is formed from a rolled steel plate, and the thickness of the backing depends upon the set thickness of the slide bearing 1. The lining layer $2_2$ is formed from copper, copper-based alloy, aluminum, aluminum-based alloy, etc., and the thickness of the lining layer is in a range of 50 to 500 μm and normally on the order of 300 μm. The surface layer 3 is formed from Pb alloy, and the thickness of the surface layer is in a range of 5 to 50 μm and normally on the order of 20 μm.

The Pb alloy forming the surface layer 3 contains 80 to 90% by weight of Pb and 3 to 20% by weight of Sn and if necessary, may contain at most 10% by weight of at least one element selected from the group consisting of Cu, In, Ag, Tl, Nb, Sb, Ni, Cd, Te, Bi, Mn, Ca and Ba.

Cu, Ni and Mn have a function to increase the hardness of the surface layer 3, but if the content of Cu, Ni and/or Mn exceeds 10% by weight, the resulting surface layer has an excessively high hardness, which will cause a reduced initial conformability. When Cu is added, it is desirable to adjust the Cu content such that the hardness Hmv of the resulting surface layer 3 is in a range of 15 to 25. The hardness Hmv of the surface layer 3 depends upon not only the content of Cu or the like, but also is influenced by the orientation of a crystal face of a Pb alloy crystal, as described hereinafter.

Each of In, Ag, Tl, Nb, Sb, Cd, Te, Bi, Ca and Ba has a function to soften the surface layer 3 to improve an initial conformability, but if its content exceeds 10% by weight, the resulting surface layer 3 has a reduced strength. When In or the like is added, it is desirable to adjust the In content such that the hardness Hmv of the resulting surface layer 3 is in a range of 8 to 15.

The surface layer 3 is formed by an electro-plating process, wherein a plating solution used is a borofluoride-based plating solution containing 40 to 180 g/l of $Pb^{2+}$ and 1.5 to 3.5 g/l of $Sn^{2+}$ and optionally, at most 15 g/l of $Cu^{2+}$. The temperature of the plating solution is set in a range of 10° to 35° C., and the cathode current density is set in a range of 3 to 15 $A/dm^2$.

Figure 3:
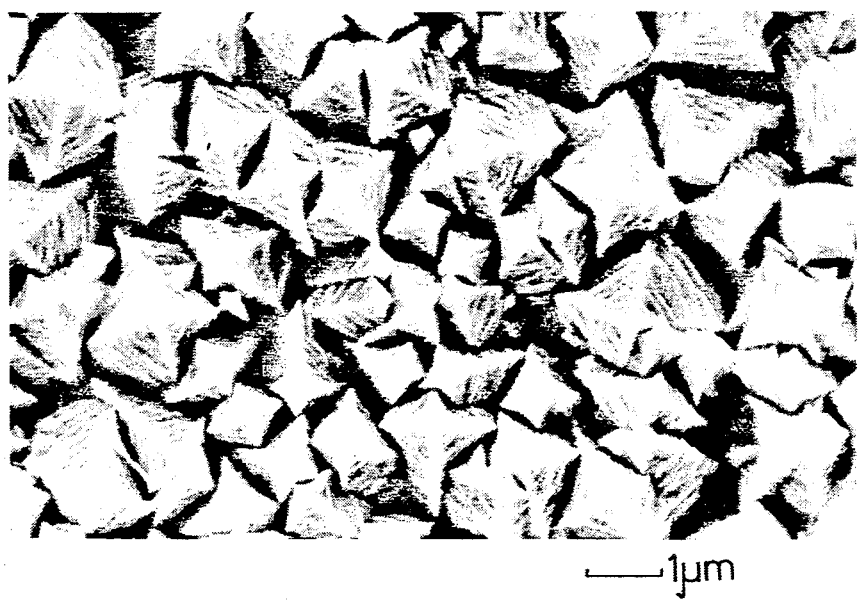
FIG. 3 is a microphotograph showing a crystal structure of a Pb alloy as a slide surface viewed from just above.

FIG. 3 is an electronic microphotograph (10,000× magnification) showing a crystal structure of the Pb alloy, as the slide surface 3a is viewed from just above. It can be seen from FIG. 3 that the surface layer 3 has a plurality of pyramid-shaped projections forming the slide surface 3, e.g., quadrangular pyramid-shaped crystals in the illustrated embodiment. In this case, the percent area A of the quadrangular pyramid-shaped crystals in the slide surface 3a is 100% (A=100%). The surface layer 3 is made of Pb alloy containing 8% by weight of Sn and 2% by weight of Cu. The surface layer 3 is formed on the lining layer $2_2$ of Cu alloy, and in forming the surface layer 3, the cathode current density in the electro-plating was set at 6 $A/dm^2$.

Figure 4:
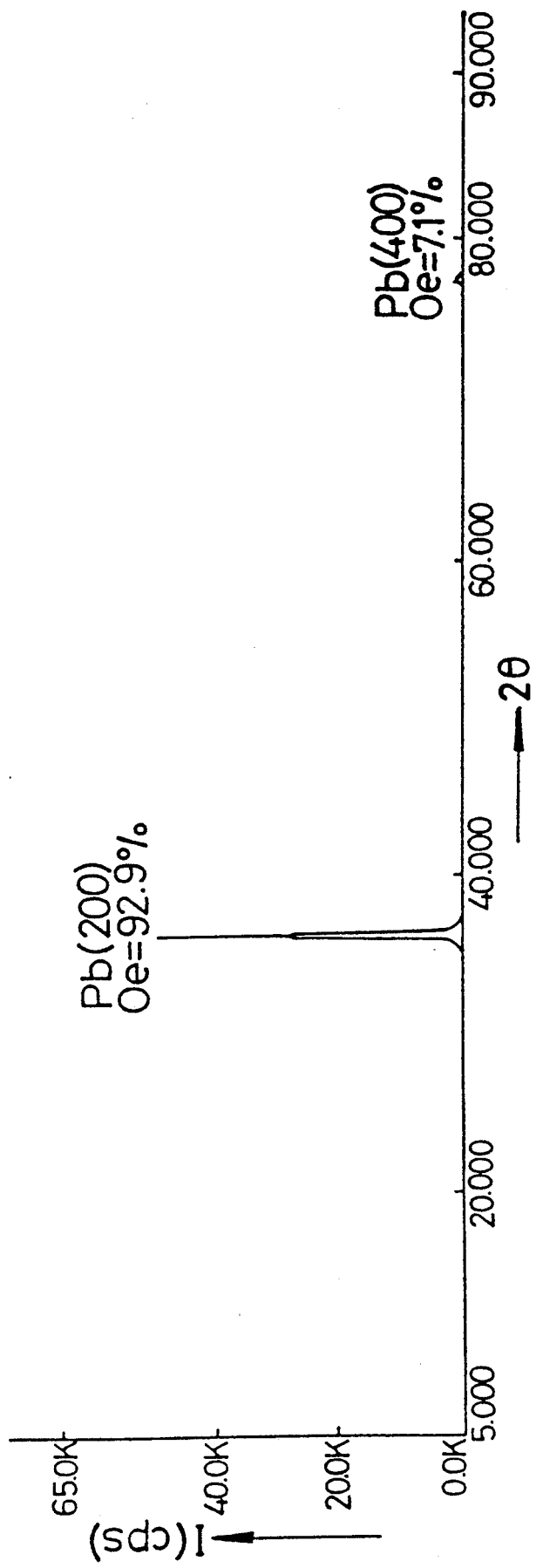
FIG. 4 is an X-ray diffraction pattern of Pb alloy crystals in a surface layer.

FIG. 4 is an X-ray diffraction pattern for the Pb alloy in the surface layer 3, wherein only diffraction peaks of planes (200) and (400) by Miller indices are observed.

Here, if an orientation index Oe indicative of the amount of crystal faces oriented in a direction perpendicular to a plane of (hkl) by Miller indices is defined as follows:

$$Oe = Ihkl/\Sigma Ihkl \times 100(\%)$$

wherein hkl is Miller indices: Ihkl is an integrated strength of a (hkl) plane; and $\Sigma$Ihkl is a sum of Ihkl. Thus, the nearer to 100% the orientation index Oe is in a certain (hkl) plane, the more crystal faces oriented in a direction perpendicular to the (hkl) plane that exist.

The integrated strength Ihkl and the orientation index Oe in the (200) and (400) plane of the Pb alloy crystal are as given in Table 1.

TABLE 1

| hkl | Integrated strength Ihkl | Orientation index Oe (%) |
|---|---|---|
| 200 | 631,414 | 92.9 |
| 400 | 48,582 | 7.1 |

As apparent from Table 1, the orientation index Oe in a (h00) plane of the Pb alloy crystal is 100% and therefore, the Pb alloy crystal has a crystal face oriented in each of directions of the crystallographic axes a, b and c, i.e., a (h00) plane.

If the crystal face is oriented in the direction perpendicular to the (h00) plane in this manner, the atom density in the direction of orientation is high, because the crystal structure of the Pb alloy is a face-centered cubic structure. Therefore, the surface layer 3 has an increased hardness and an improved seizure resistance.

Figure 5:
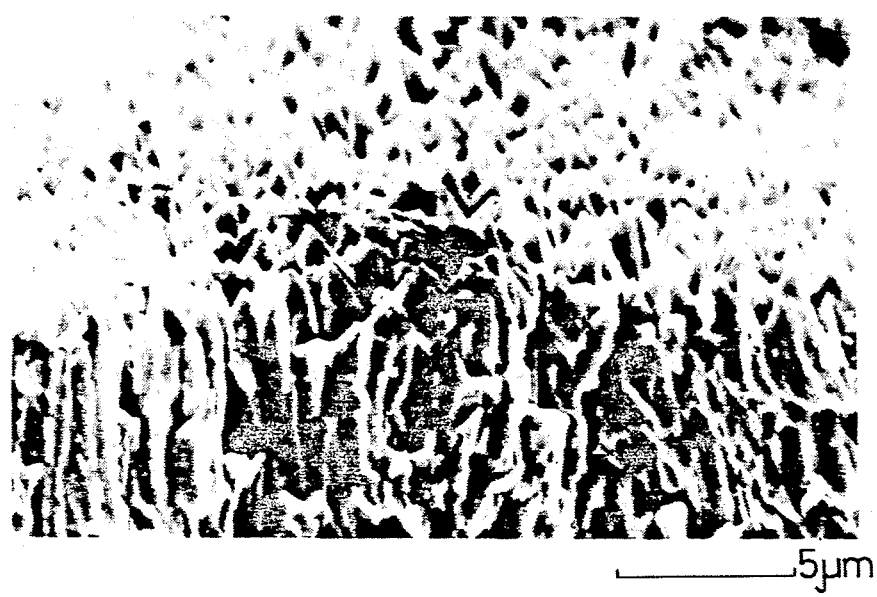
FIG. 5 is a microphotograph showing a crystal structure of the Pb alloy in longitudinal section of the surface layer.
Figure 6:
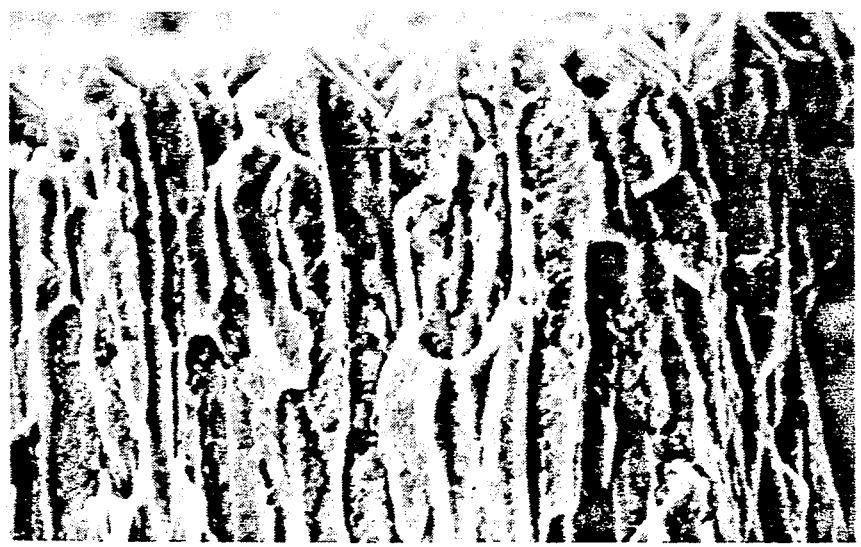
FIG. 6 is a microphotograph showing a part of FIG. 5 taken at an enlarged scale.
Figure 7:
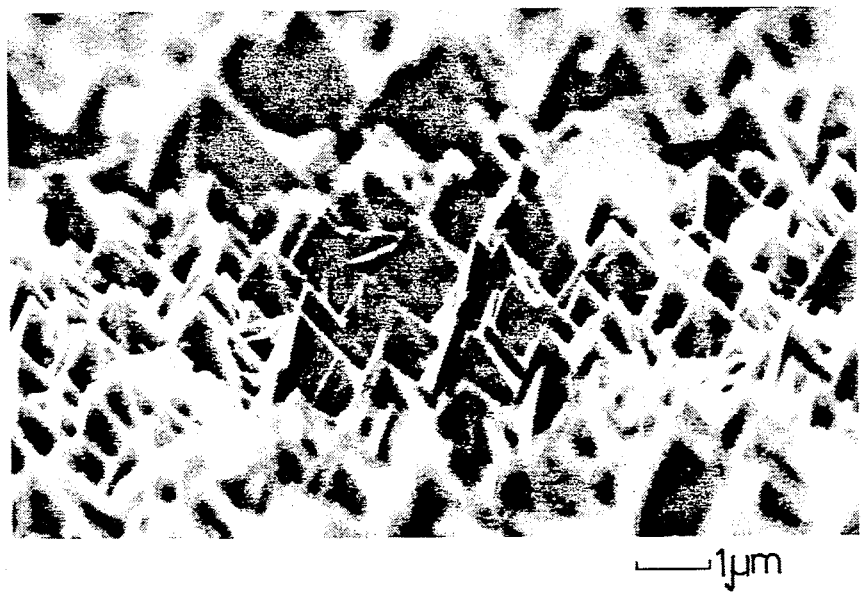
FIG. 7 is a microphotograph showing a crystal structure of the Pb alloy as a slide surface viewed from above but obliquely.

FIG. 5 is an electronic microphotograph (5,000× magnification) showing a crystal structure in a longitudinal section of the surface layer 3, and FIG. 6 corresponds to a partially enlarged electronic microphotograph taken from FIG. 5. FIG. 7 is an electronic microphotograph (10,000× magnification) showing a crystal structure of a Pb alloy, as the slide surface 3 is viewed from the above but obliquely.

As can be seen from FIGS. 3 and 5 to 8, the surface layer 3 comprises an aggregate of columnar crystals 4 of Pb alloy extending from the lining layer $2_2$. A quadrangular pyramid-shaped crystal 5 is continuously provided on each columnar body 4a in the columnar crystal 4 to form a tip end of the columnar crystal 4. An apex a1 of each pyramid-shaped crystal 5 is directed toward the slide surface 3a. The majority of the quadrangular pyramid-shaped crystals 5 grow straight, but a few grow inclined somewhat. Further, among the columnar crystals 4, there exist some crystals 4 which extend from the lining layer $2_2$ but are broken or cut midway. In some instances, there are crystals 4 which extend from such broken crystals.

Figure 8:
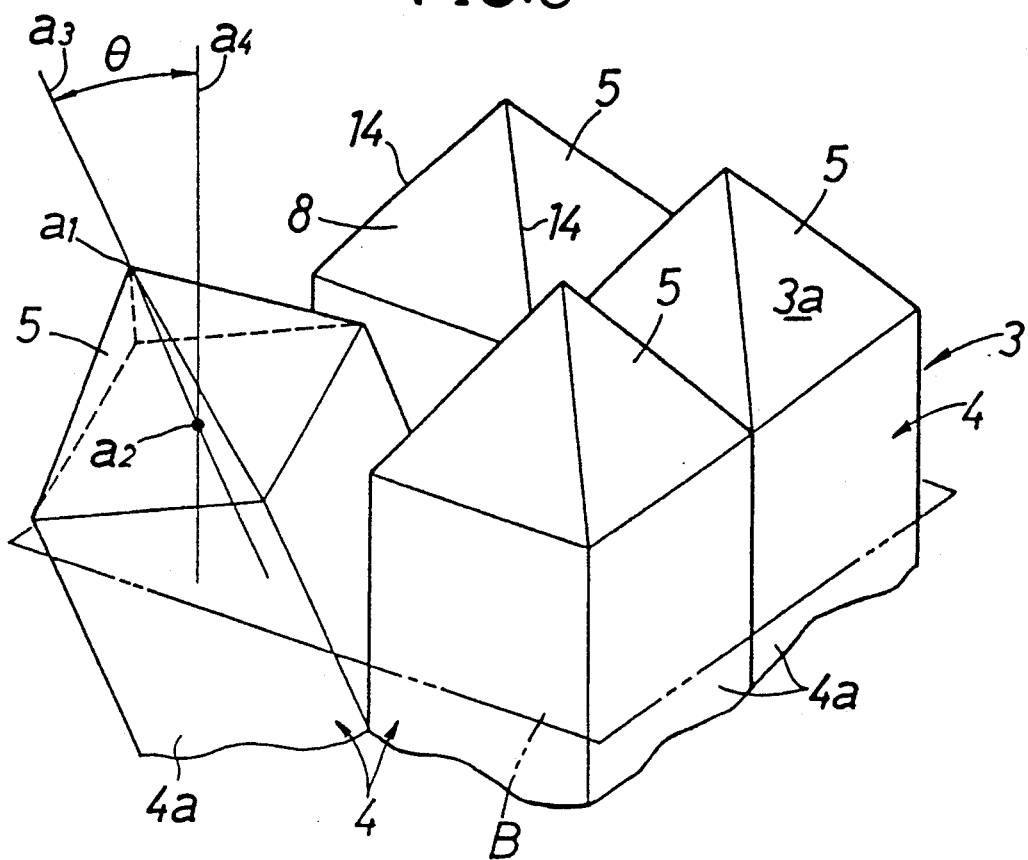
FIG. 8 is a schematic perspective view of an essential portion of the surface layer.
Figure 9:
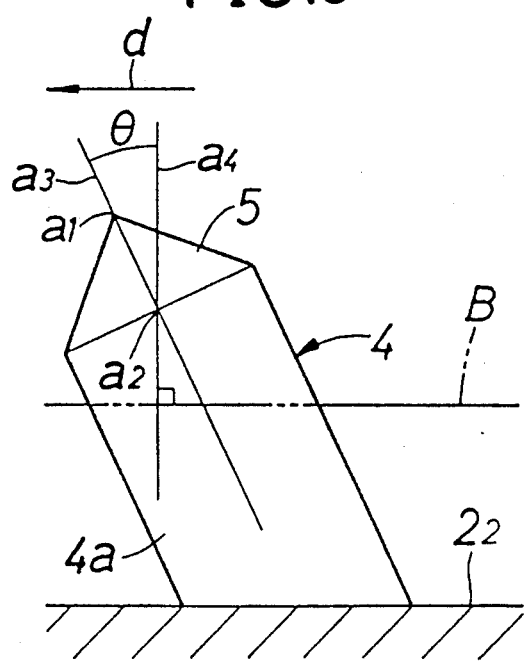
FIG. 9 is a diagram for explaining a method for measuring the inclination angle of a quadrangular pyramid-shaped crystal.

Here, it has been ascertained that if a phantom plane B extending along the slide surface 3a is defined on the side of the bases of the quadragular pyramid-shaped crystals 5, and the inclination angle defined by a straight line a3 passing through the apex a1 and a central portion a2 of the base face of the quadrangular pyramid-shaped crystal 5 with respect to a reference line a4 passing the central portion a2 and perpendicular to the phantom plane B is defined as $\theta$, as shown in FIGS. 8 and 9, all (100%) of the quadrangular pyramid-shaped crystals 5 shown in FIGS. 3, 5 to 7 have an inclination angle $\theta \approx 0°$ and therefore, each quadrangular pyramid-shaped crystal 5 has grown substantially straight.

If the slide surface 3a is formed of the quadrangular pyramid-shaped crystals 5 as described above, it is possible to increase the surface area of the slide surface 3a, so that the surface layer 3 has a sufficient oil retention characteristic, and to permit the apexes a1 of the quadrangular pyramid-shaped crystals 5 to preferentially wear to improve the initial conformability of the surface layer 3.

Figure 10:
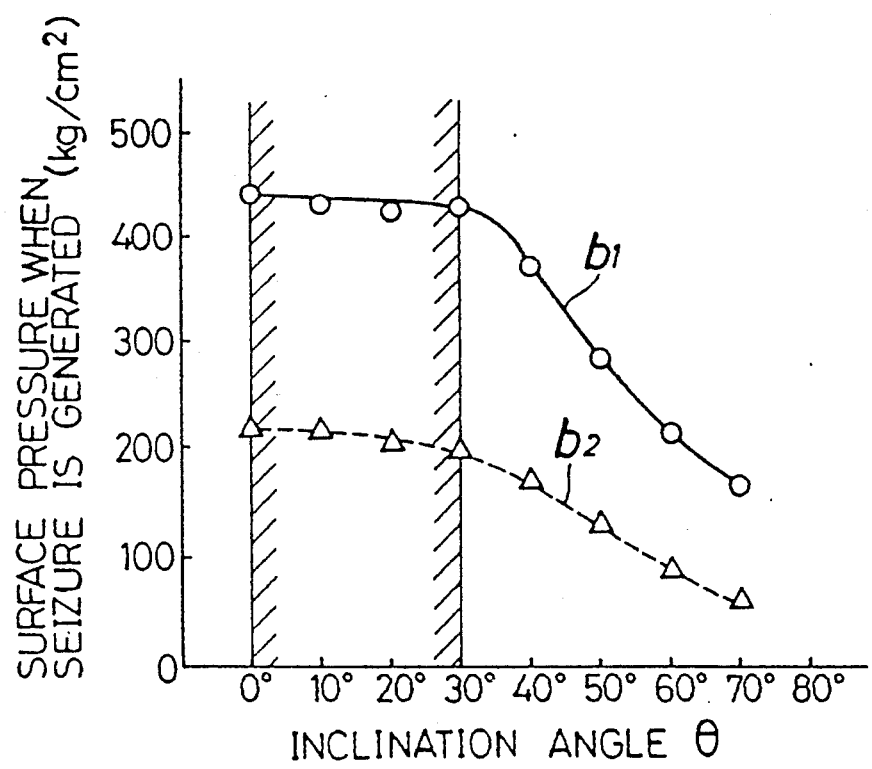
FIG. 10 is a graph illustrating a relationship between the inclination angle and the surface pressure when seizure is generated.

To achieve such effects, the range of inclination angle $\theta$ of the quadrangular pyramid-shaped crystal 5 becomes a problem. Thereupon, slide bearings including quadrangular pyramid-shaped crystals 5 having inclination angle $\theta \approx 0°$, 10°, 20°, 30°, 40°, 50°, 60°, and 70° and having an orientation index Oe of 100% in the (h00) plane, and slide bearings having the similar inclination angles and an orientation index Oe of 50 to 55% in the (h00) plane were fabricated. The results of seizure tests for these slide bearings are shown in FIG. 10. In FIG. 10, line b1 corresponds to the result of the slide bearings whose orientation index Oe is 100%, and a line b2 corresponds to the result of the slide bearings whose orientation index Oe is 50 to 55%. In this case, the present area A of the quadrangular pyramid-shaped crystals 5 in the slide surface 3a is 100% (A=100%). It should be noted that the variation in inclination angle $\theta$ is basically achieved by varying the inclination of the base 2 with respect to an anode.

The seizure test was carried out by bringing each of the slide bearings into slide contact with a rotary shaft and gradually increasing the load applied to the slide bearing. FIG. 10 is a graph illustrating surface pressures determined when seizure was generated in the surface layer of each slide bearing.

The test conditions were as follows: the material used for the rotary shaft was a nitrided JIS S48C material: the number of revolutions of the rotary shaft was 6,000 rpm; the oil supply temperature was 120° C.; the oil supply pressure 3 $kg/cm^2$; and the applied load was 1 kg/sec.

It can be seen from the line b1 in FIG. 10 that when the orientation index in the (h00) plane of all the quadrangular pyramid-shaped crystals 5 is 100%, and the inclination angle $\theta$ is $0° \leq \theta \leq 30°$, the surface pressure at the time of seizure is increased, leading to an increased seizure resistance. However, in the case of the line b2, the seizure resistance is poor due to the low orientation index Oe.

In the quadrangular pyramid-shaped crystal 5, if the preferential wear of the apex a1 is completed at the initial stage of the start of sliding movement to form a flat surface (which corresponds to an upper base face of a truncated-quadrangular pyramid form), an oil film is always present between the flat surface and the rotary shaft and hence, slide surface 3a will be worn extremely slowly after formation of the flat surface.

Tables 2 and 4 each illustrate a relationship among the inclination angle θ, the direction of orientation, the percent area A in the slide surface 3a and the hardness Hmv of the quadrangular pyramid-shaped crystals 5 for the slide bearings (1) to (8).

In each of Tables 2 to 4, the direction of orientation (h00) means that the orientation index in the (h00) plane is 100%, while the direction of orientation (111) means inclusion of not only the (111) plane but also the (222), (220), (311) planes and the like. In the Pb alloy crystal, there is a tendency that as the orientation index Oe in the (h00) plane is decreased, the orientation index in the (111) plane is increased. In addition, the orientation index Oe in both the (220) and (311) planes is also increased, although the extent of such increase is extremely low, as compared with the extent of increase in the orientation index Oe in the (111) plane.

TABLE 2

| Slide Bearing | Quadrangular Pyramid-Shaped Crystal | | | Hardness Hmv |
|---|---|---|---|---|
| | Incli. Angle | Dire. of Orien. | % Area | |
| (1) | 0° ≦ θ ≦ 10° | (h00) | 100% | 23 |
| (2) | 0° ≦ θ ≦ 10° | (h00) | 80% | 19 |
| | 35° ≦ θ ≦ 65° | (111) | 20% | |
| (3) | 0° ≦ θ ≦ 10° | (h00) | 50% | 16 |
| | 35° ≦ θ ≦ 65° | (111) | 50% | |
| (4) | 0° ≦ θ ≦ 10° | (h00) | 20% | 13 |
| | 35° ≦ θ ≦ 65° | (111) | 80% | |

TABLE 3

| Slide bearing | Quadrangular Pyramid-Shaped Crystal | | | Hardness Hmv |
|---|---|---|---|---|
| | Incli. Angle | Dire. of Orien. | % Area | |
| (5) | 0° ≦ θ ≦ 20° | (h00) | 80% | 18 |
| | 35° ≦ θ ≦ 65° | (111) | 20% | |

TABLE 4

| Slide bearing | Quadrangular Pyramid-Shaped Crystal | | | Hardness Hmv |
|---|---|---|---|---|
| | Incli. Angle | Dire. of Orien. | % AREA | |
| (6) | 0° ≦ θ ≦ 10° | (h00) | 50% | 22 |
| | 10° ≦ θ ≦ 30° | (h00) | 50% | |
| (7) | 0° ≦ θ ≦ 30° | (h00) | 50% | 15 |
| | 35° ≦ θ ≦ 65° | (111) | 50% | |
| (8) | 0° ≦ θ ≦ 30° | (h00) | 20% | 12 |
| | 35° ≦ θ ≦ 65° | (111) | 80% | |

Incli. = Inclination
Dire. of orien. = Direction of orientation

Figure 11:
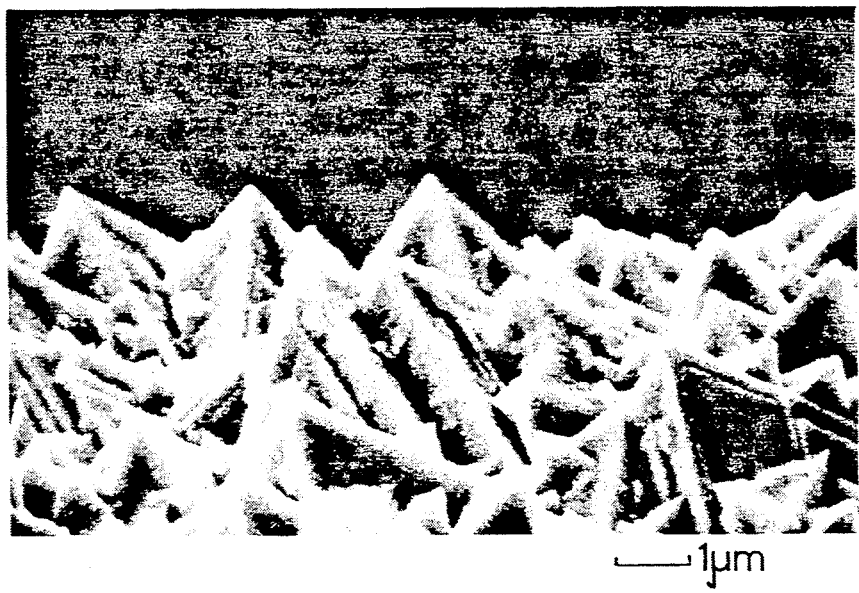
FIG. 11 is a microphotograph showing a crystal structure of a Pb alloy as slide a surface viewed from above but obliquely.
Figure 12:
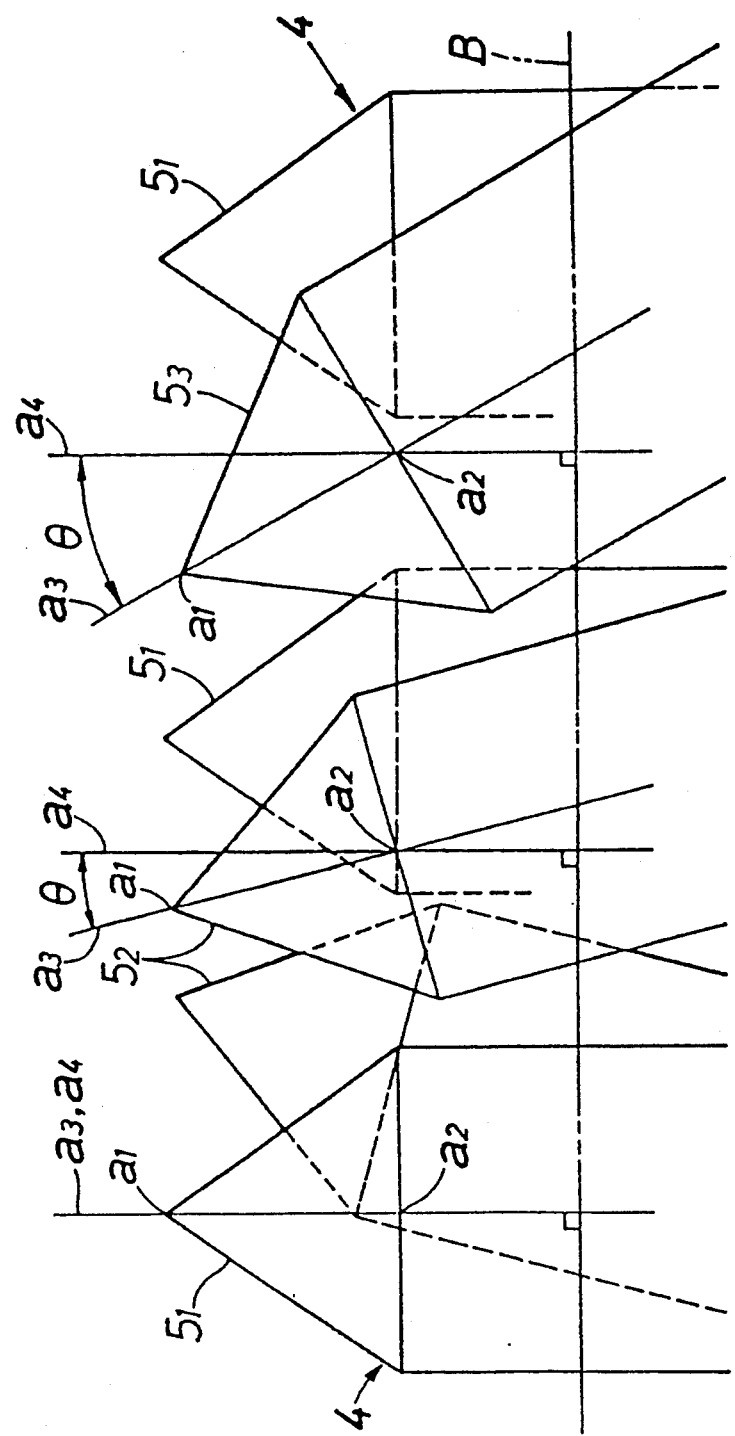
FIG. 12 is a schematic side view of an essential portion of the surface layer.

FIG. 11 is an electronic microphotograph (10,000× magnification) showing a crystal structure of the Pb alloy, as the slide surface 3a of the slide bearing shown in FIG. 4 is viewed from above but obliquely. FIG. 12 shows the inclinations of quadrangular pyramid-shaped crystals shown in FIG. 11. The inclination angles θ of the quadrangular pyramid-shaped crystals $5_1$, $5_2$ and $5_3$ are approximately 0°, 15° and 30° ($\theta \approx 0°$, 15° and 30°), respectively.

Figure 13:
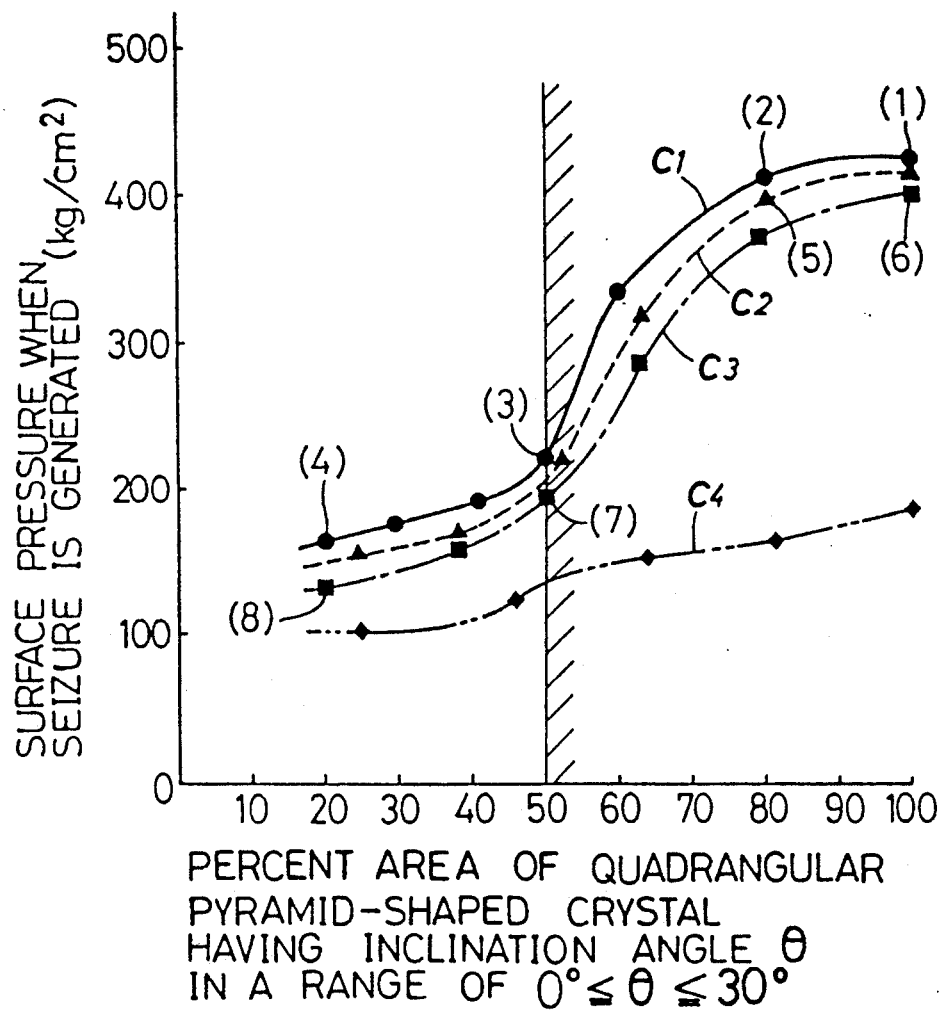
FIG. 13 is a graph illustrating a relationship between the surface pressure when seizure is generated and the percent area of quadrangular pyramid-shaped crystals having an inclination angle $\theta$ in a range of $0° \leq \theta \leq 30°$.

FIG. 13 illustrates a relationship between the percent area of the quadrangular pyramid-shaped crystals having inclination angles θ in a range of 0°≦θ≦30° and the surface pressure when seizure is generated. The seizure tests were carried out in the same manner and under the same conditions as those described above. In FIG. 13, a line c1 corresponds to the result for the case where the inclination angles θ are 0°≦θ≦10°. This includes the slide bearings (1) to (4) given in Table 2, and the results for these slide bearings are indicated by spots (1) to (4) in FIG. 13. A line c2 corresponds to the result of the case where the inclination angles θ are 0°≦θ≦20°. This includes the slide bearing (5) given in Table 3, and the result for this slide bearing is indicated by a spot (5) in FIG. 13. A line c3 corresponds to the result for the case where the inclination angles θ are 0°≦θ≦30°. This includes the slide bearings (6) to (8) given in Table 4, and the results for these slide bearings are indicated by spots (6) to (8) in FIG. 13.

Figure 14:
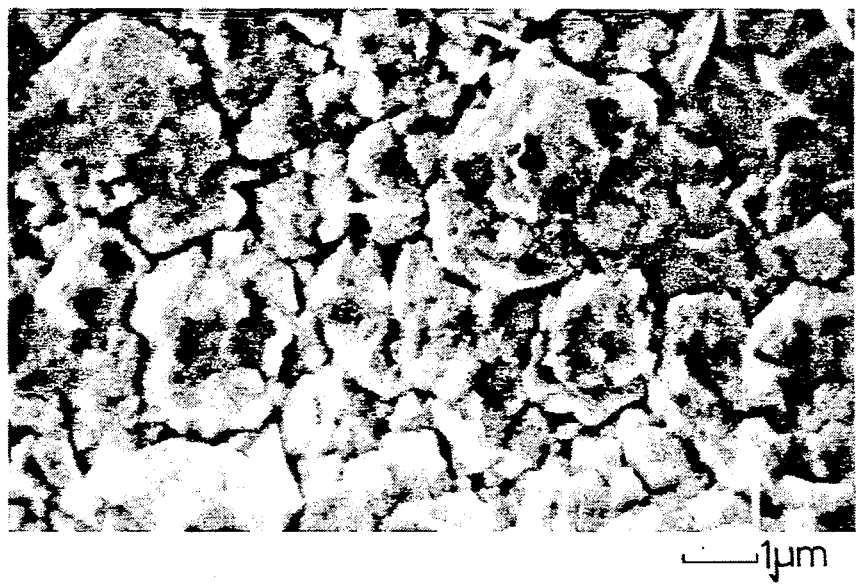
FIG. 14 is a microphotograph showing a crystal structure of a Pb alloy as a slide surface in a comparative example viewed from just above.
Figure 15:
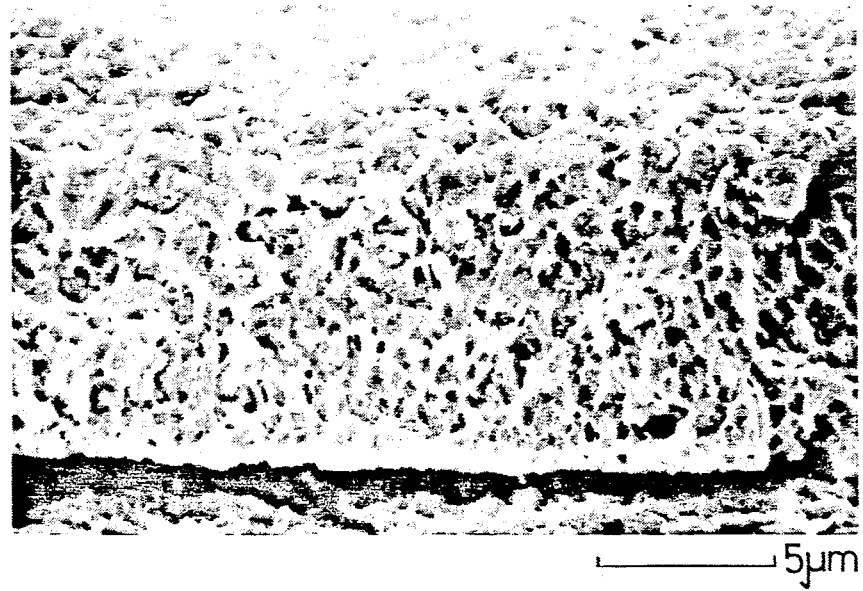
FIG. 15 is a microphotograph showing a crystal structure of the Pb alloy in a longitudinal section of a surface layer in the comparative example.

A line c4 shows a comparative example with a slide surface formed from granular crystals of a Pb alloy. FIG. 14 is an electronic microphotograph (10,000× magnification) showing a crystal structure of the Pb alloy, as the slide surface of the comparative example is viewed from just above. It can be seen from FIG. 14 that the crystal form of the comparative example is random. FIG. 15 is an electron microphotograph (10,000× magnification) showing a crystal structure of the Pb alloy in a longitudinal section of the slide surface of the comparative example, from which it can be observed that no columnar crystal is produced. Due to this, the hardness of the surface layer of the comparative example is lower than that of the surface layer having the orientation in the (h00) plane.

FIG. 15A illustrates a relationship between the hardness and the surface pressure when seizure is generated. The inclination angle θ, the direction of orientation and the percent area A of quadrangular pyramid-shaped crystals 5 in the slide surface 3a for slide bearings (9) to (12) corresponding to lines (9) to (12) in FIG. 15A are as given in Table 5. The seizure test was carried out in the same manner and under the same condition as those described above.

TABLE 6

| Slide Bearing | Quadrangular Pyramid-Shaped | | Crystal % Area |
|---|---|---|---|
| | Incli. Angle | Dire. of Orien. | |
| (9) | 0° ≦ θ ≦ 10° | (h00) | 100% |
| (10) | 0° ≦ θ ≦ 10° | (h00) | 60% |
| | 35° ≦ θ ≦ 65° | (111) | 40% |
| (11) | 0° ≦ θ ≦ 10° | (h00) | 50% |
| | 35° ≦ θ ≦ 65° | (111) | 50% |
| (12) | 0° ≦ θ ≦ 10° | (h00) | 20% |
| | 35° ≦ θ ≦ 65° | (111) | 80% |

As apparent from FIGS. 13 and 15A and Tables 2 to 5, the seizure resistance of the surface layer 3 can be substantially improved, if the orientation index Oe in the (h00) direction of orientation and thus in the (h00) plane in the quadrangular pyramid-shaped crystals is 100%, and the percent area A of the quadrangular pyramid-shaped crystals 5 in the slide surface 3a is equal to or more than 50% (i.e., A≧50%), and if the inclination angle θ of the quadrangular pyramid-shaped crystal 5 is 0°≦θ≦30° and further, if the hardness Hmv of the quadrangular pyramid-shaped crystal 5 is 15≦Hmv≦30. In this case, if the inclination angle θ is larger than 30° (θ≧30°), the oil retention property of the surface layer 3 and the preferential wear property of the apex a1 are reduced. In general, if the hardness of the surface layer 3 is increased, the wear resistance thereof is also increased. But if the hardness Hmv is in a range of Hmv≦15 or Hmv≦30, both the seizure and wear resistances of the surface layer 3 tend to be reduced.

If the amount of quadrangular pyramid-shaped crystals present in the slide surface 3a is defined by the number per unit area, in place of the percent area A, the amount (the number) C of quadrangular pyramid-shaped crystals present is in a range of $2 \times 10^4/mm^2 \leq C \leq 5 \times 10^6/mm^2$.

If the crystal form and the amount C of quadrangular pyramid-shaped crystals present are specified in this manner, the surface area of the slide surface 3a can be increased, so that the surface layer 3 has a sufficient oil retension property, and apexes a1 of the quadrangular pyramid-shaped crystals 5 can be preferentially worn to improve the initial conformability of the surface layer 3.

However, if the amount C of quadrangular pyramid-shaped crystals is less than $2 \times 10^4/mm^2$, the above-described effects cannot be obtained. On the other hand, if the amount C of quadrangular pyramid-shaped crystals is more than $5 \times 10^6/mm^2$, the above-described effects cannot be likewise obtained, because the quadrangular pyramid-shaped crystals are extremely fine.

Figure 18:
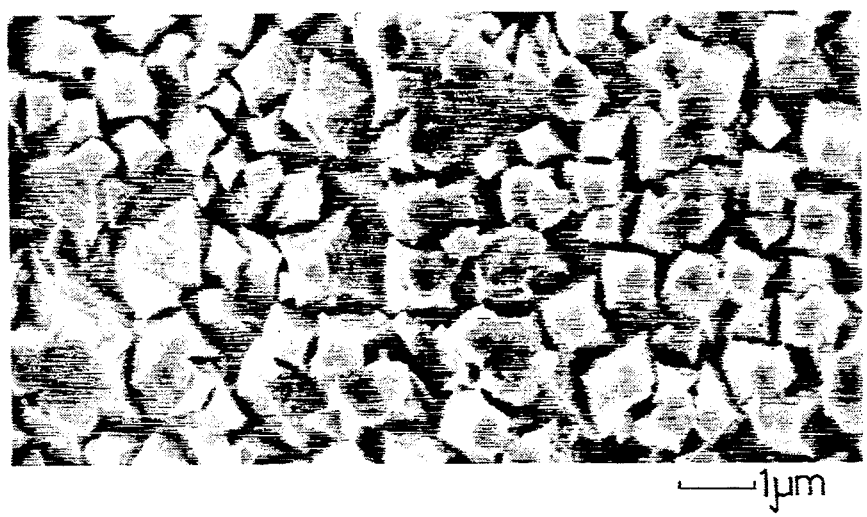
FIG. 18 is a microphotograph showing a crystal structure of the Pb alloy as the slide surface viewed from just above.

Table 6 shows the comparison of the various slide bearings (13) to (18) in composition of surface layer, orientation index Oe in the (h00) plane, crystal form and the like.

slide surface 3a. The truncated-quadrangular pyramid-shaped crystals 6 forms a tip end of a columnar crystal 4 with its upper base face 7 directed toward the slide surface 3a. FIG. 18 is an electronic microphotograph (10,000× magnification) showing a crystal structure of the Pb alloy, as the slide surface 3a is viewed from just above. In this case, the inclination angle $\theta$ is defined as an angle formed by two lines: a straight line a7 passing a central portion a5 of the upper base face and a central portion a6 of a lower base face; and a reference line a4 passing the central portion a6 of the lower base face and perpendicular to a phantom plane B.

Even when the surface layer 3 has only truncated-quadrangular pyramid-shaped crystals 6, as well as even when it has quadrangular pyramid-shaped crystals 5 and truncated-quadrangular pyramid-shaped crystals 6 in combination, a percent area A of the truncated-quadrangular pyramid-shaped crystals 6 or the like in the slide surface 3a is set in a range of $A \leq 50\%$, and the inclination angle $\theta$ is in a range of $0° \leq \theta \leq 30°$. This ensures that the same slide characteristic as described above can be obtained. The number per unit area is also in the same range as that described above. In this case, at least a portion of the slide surface 3a is formed from the upper base faces 7 of the truncated-quadrangular pyramid-shaped crystals 6. This ensures that an oil film can be formed between a mating member and the upper base faces 7 from an initial stage of the start of sliding movement, thereby providing an improved initial con-

TABLE 6

| Slide Bearing | Che. Constituent (% by weight) | | | Crystal | | | | | Density (A/dm²) |
|---|---|---|---|---|---|---|---|---|---|
| | Sn | Cu | Pb | Oe (%) | Form | Amount (N/mm²) | $\theta°$ | Area (%) | |
| (13) | 8 | 2 | Balance | 100 | Qua. | $10^6$ | ≦10 | 87 | 6 |
| (14) | 8 | 2 | Balance | 100 | Qua. | $6 \times 10^5$ | ≦10 | 95 | 8 |
| (15) | 8 | 2 | Balance | 100 | Qua. | $8 \times 10^4$ | ≦15 | 95 | 10 |
| (16) | 10.5 | 2.5 | Balance | 100 | Qua. | $6 \times 10^5$ | ≦30 | 60 | 3 |
| (17) | 8 | 2 | Balance | 23.2 | Gra. | — | — | — | |
| (18) | 10 | 2.5 | Balance | 50.2 | Gra. | — | — | — | |

Chem = Chemical
Oe = Oe in (h00) plane
Form = Crystal form
Amount = Amount in quadrangular pyramid-shaped crystals
N/mm² = Number/mm²
Density = Cathode current density
Qua. = Quadrangular pyramid-shaped
Gra. = Granular FIG. 15 B illustrates results of the seizure tests for the slide bearings (13) to (18).

The seizure tests were carried out by bringing each of the slide bearings into slide contact with the rotary shaft and gradually increasing the load applied to the slide bearing. FIG. 15B shows surface pressures determined when a seizure is produced in the surface layer of each of the slide bearings.

The test conditions were as follows: the material used for the rotary shaft was a nitrided JIS S48C material: the number of revolutions of the rotary shaft was 6,000 rpm; the oil supply temperature was 120° C.; the oil supply pressure was 3 kg/cm²; and the applied load was 1 kg/sec.

As apparent from FIG. 15B, it can be seen that all the slide bearings (13) to (16) in the examples of the present invention have an excellent seizure resistance, as compared with the slide bearings (17) and (18) in the comparative examples.

Figure 16:
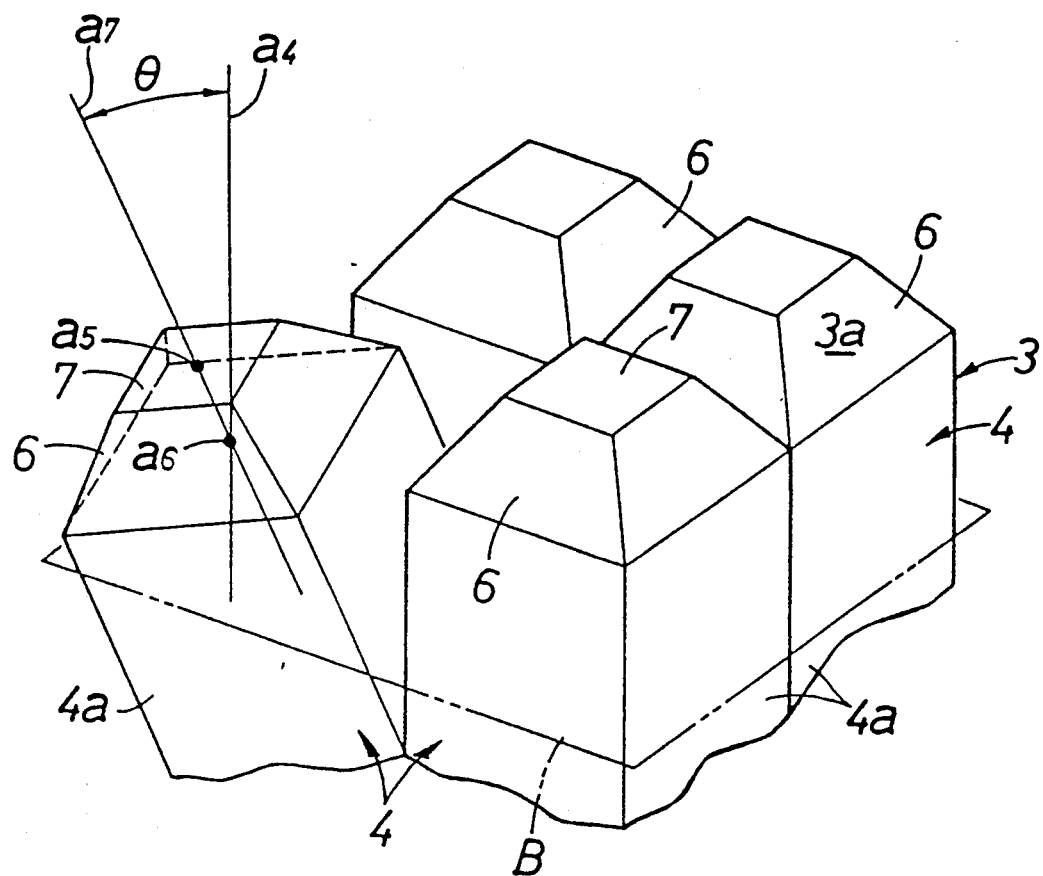
FIG. 16 is a schematic perspective view of an essential portion of the surface layer.
Figure 17:
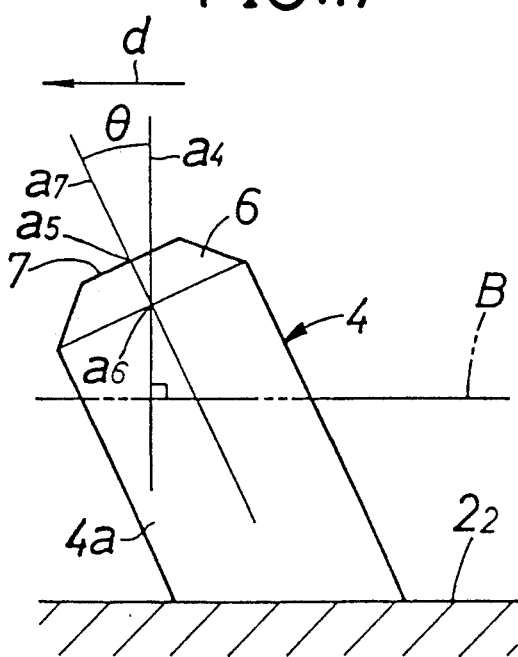
FIG. 17 is a diagram for explaining a method for measuring the inclination angle of a truncated-quadrangular pyramid-shaped crystal.

FIGS. 16 to 18 illustrate a surface layer 3 having a plurality of truncated-pyramid-shaped projections, e.g., truncated-quadrangular pyramid-shaped crystals 6, of Pb alloy in the illustrated embodiment, which form a formability and a stabilization. It should be noted that when the surface layer 3 has both the crystals 5 and 6, the percent area A can be found from a sum of the areas of the crystals 5 and 6 and the area of the slide surface 3a.

When the crystals 5 and 6 are inclined, their inclination should be such that the apex a1 and the upper base face 7 should be directed toward a direction d of sliding movement with the mating member. This minimizes the resistance to sliding movement between the mating member and the crystals 5 and 6.

FIGS. 19 to 27 illustrate a second embodiment of the present invention.

Figure 19:
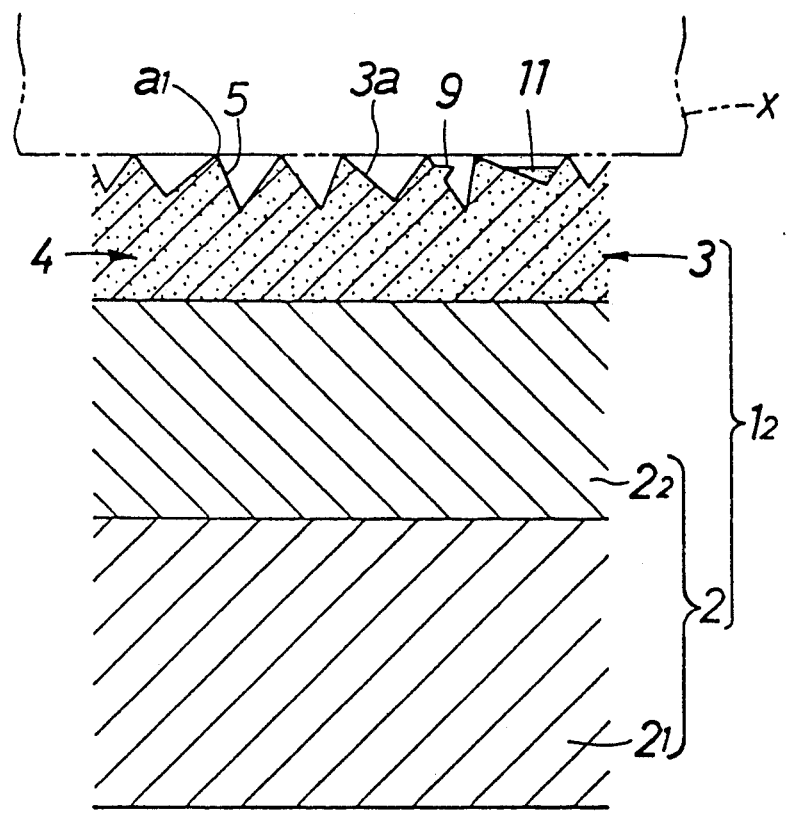
FIG. 19 is a sectional view of a slide bearing, similar to FIG. 2.
Figure 20:
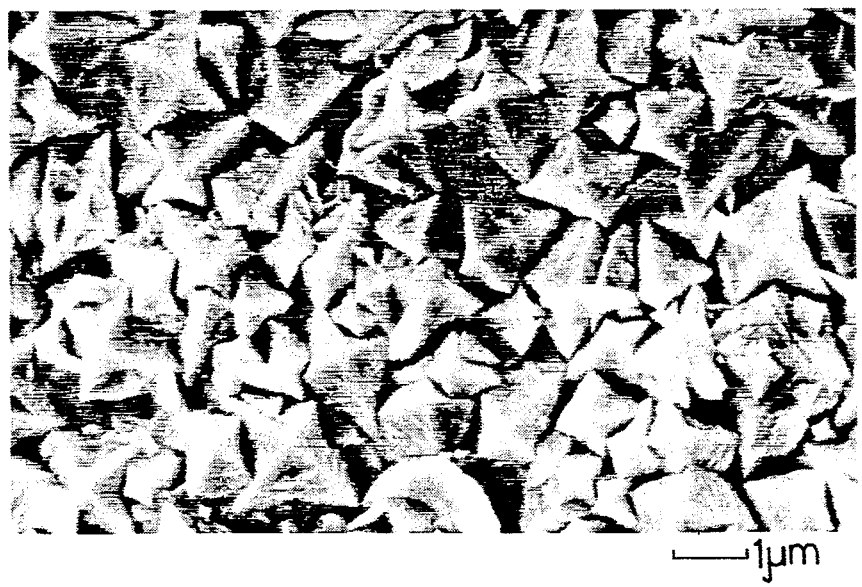
FIG. 20 is a microphotograph showing a crystal structure of the Pb alloy in the slide surface.
Figure 21:
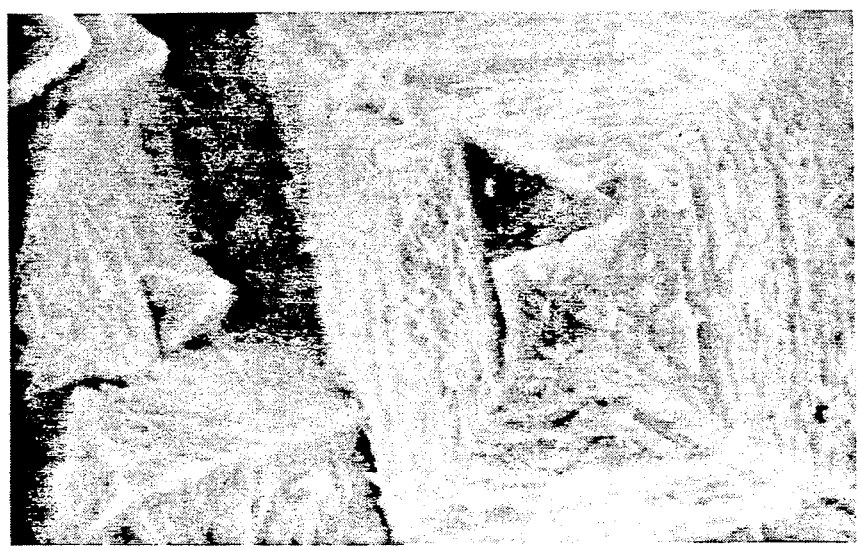
FIG. 21 is a microphotograph showing an essential portion of FIG. 20 taken at an englarged scale.

FIG. 19 is a sectional view of a slide bearing, similar to FIG. 2, and FIG. 20 is an electronic microphotograph (10,000× magnification) showing a crystal structure of a Pb alloy in a slide surface 3a. FIG. 21 is an electronic microphotograph taken at an enlarged scale of a part of FIG. 20. Surface layer 3 is made of a Pb alloy containing 8% by weight of Sn and 2% by weight of Cu. The surface layer 3 is formed on a lining $2_2$ of Cu alloy, and in forming the surface layer 3, the cathode current density in an electro-plating process was set at 6 to 10 A/dm².

Figure 22:
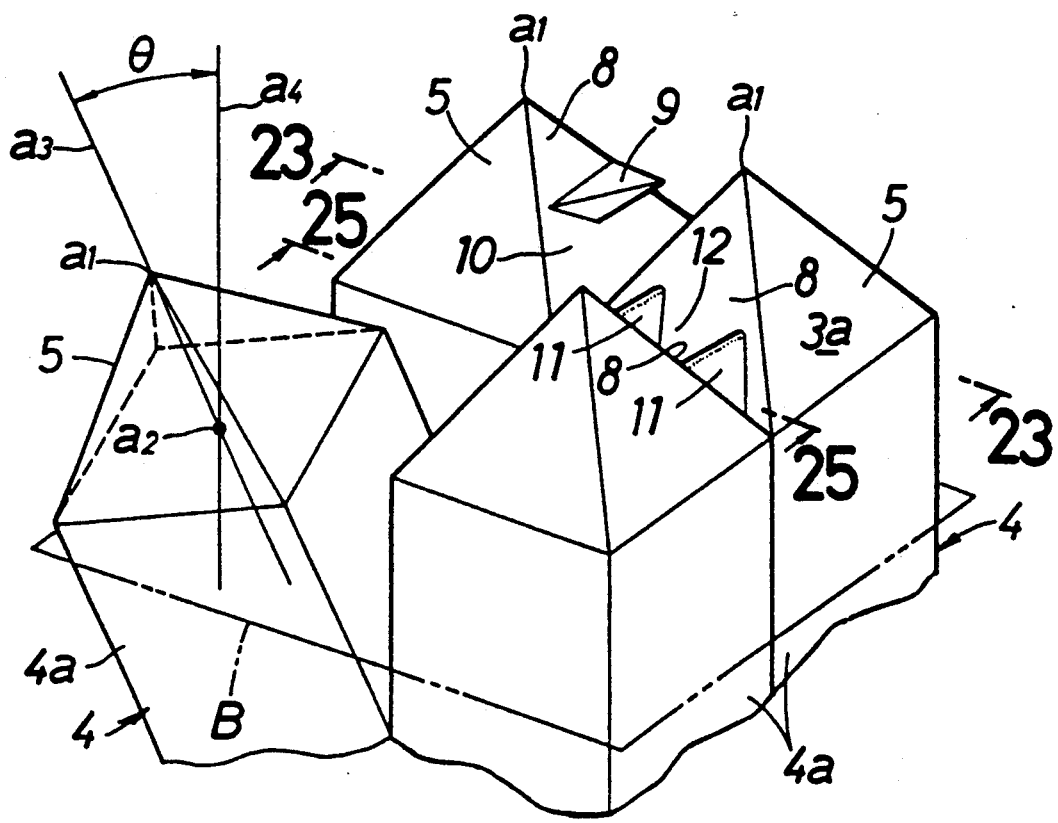
FIG. 22 is a schematic perspective view of an essential portion of the surface layer.

As clearly shown in FIGS. 20 to 22, the surface layer 3 has a plurality of pyramid-shaped projections, e.g., quadrangular pyramid-shaped crystals 5 of the Pb alloy in the illustrated embodiment, with their apexes a1 directed toward a slide surface 3a. Each of the quadrangular pyramid-shaped crystals 5 forms a tip end of each columnar crystal 4 extending form the lining layer 2₂ and hence, the surface layer 3 is formed from a aggregate of columnar crystals 4.

As in the first embodiment, such quadrangular pyramid-shaped crystals 5 serve to provide an improved initial conformability of the surface layer 3, so that the surface layer 3 has a sufficient oil retention property.

Figure 23:
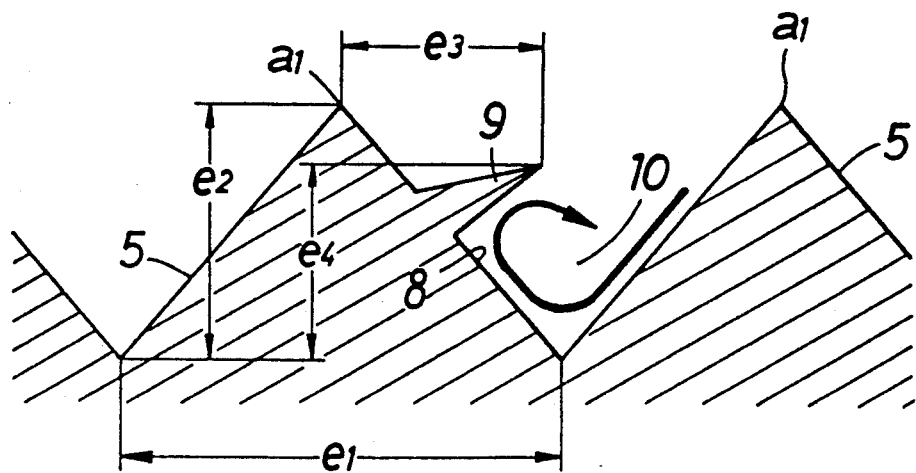
FIG. 23 is a sectional view taken along a line 23—23 in FIG. 22.

As shown in FIG. 23, some (or all) of the quadrangular pyramid-shaped crystals 5 each include a projection piece 9 on a slant 8 thereof.

With such a configuration, when oil entering a valley 10 between adjacent quadrangular pyramid-shaped crystals 5 flows toward the apex a1, the oil collides against the projection piece 9, as shown by the arrow in FIG. 23. The oil which has collided is forced back to the base of the crystal 5, e.g., to the valley in the illustrated embodiment, by the projection piece 9 and is temporarily retained therein. This also improves the oil retention property of the surface layer 3. In order to provide such a retention effect, when the length of the base of the crystal 5 is represented by e1; the height of the crystal 5 is by e2; the projecting length of the projection piece 9 is by e3; and the height of the projection piece 9 is by 4, (e3/e1)×100 may be equal to or less than 50 (%), and (e4/e2)×100 may be equal to or more than 50 (%).

Figure 24:
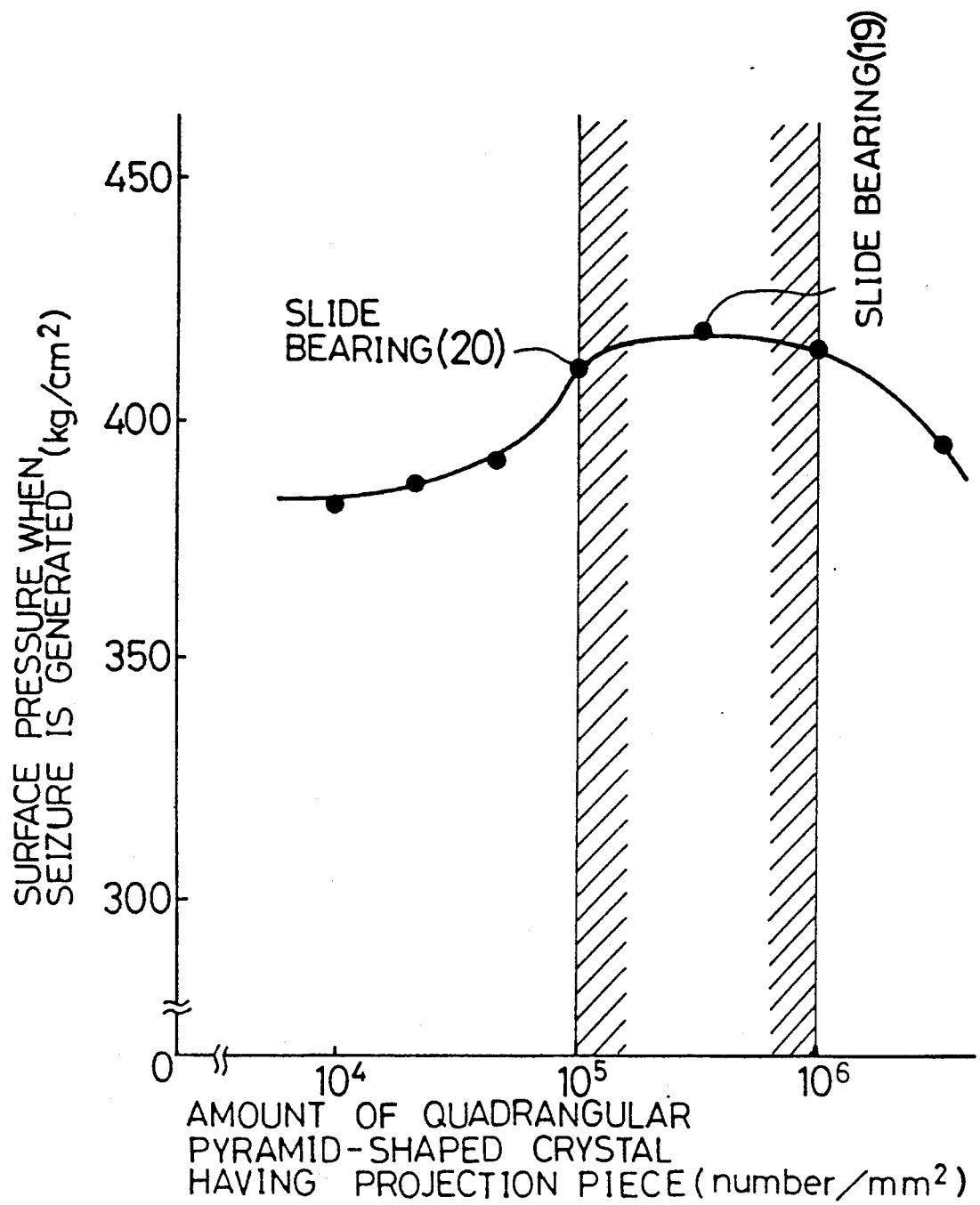
FIG. 24 is a graph illustrating a relationship between the amount of quadrangular pyramid-shaped crystals having protrusion pieces and the surface pressure when seizure is generated.

FIG. 24 illustrates a relationship between the amount of the crystals 5 having the projection piece 9 and the surface pressure when seizure is generated.

The seizure tests were carried out by bringing each of the slide bearings into slide contact with a rotary shaft and gradually increasing the load applied to the rotary shaft. FIG. 24 is a graph illustrating the surface pressure determined when a seizure is produced in the surface layer of the slide bearing.

The test conditions were as follows: the material used for a rotary shaft was nitrided JIS S48C material; the number of revolutions of the rotary shaft 6,000 rpm; the oil supply temperature was 120° C.; the oil supply pressure was 3 kg/cm²; and the applied load was 1 kg/sec.

As apparent from FIG. 24, the amount D of the quadrangular pyramid-shaped crystals 5 having the projection pieces 9 is preferably in a range represented by $10^5/mm^2 \leq D \leq 10^6/mm^2$. If the amount D is less than $10^5/mm^2$ ($D \leq 10^5/mm^2$), the effect of improving the oil retention property by the projection pieces 9 is reduced. But if the amount D is more than $10^6/mm^2$ ($D \leq 10^6/mm^2$), the flow of oil is obstructed by the projection pieces 9, resulting in a reduced oil-cooling property.

Figure 25:
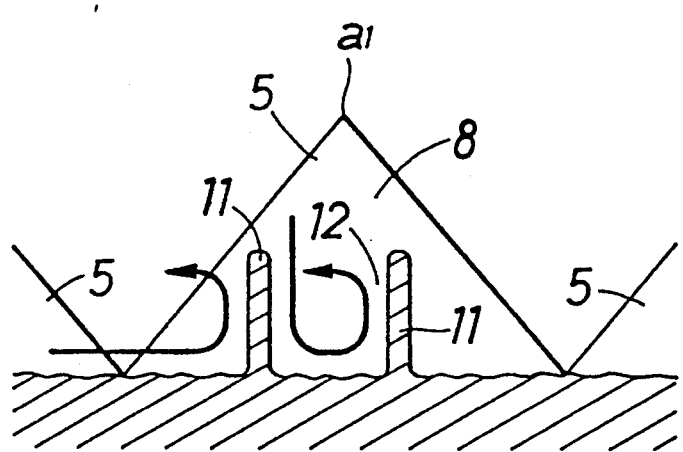
FIG. 25 is a sectional view taken along a line 25—25 in FIG. 22.

As shown in FIGS. 20, 22 and 25, the slants 8 of some pairs of adjacent quadrangular pyramid-shaped crystals 5 are interconnected, for example, by a pair of blocking pieces 11 which define an oil reservoir 12 for temporarily retaining oil between adjacent crystals 5, as shown by a right arrow in FIG. 25. The blocking piece 11 also has a function to change the direction of the flow of oil colliding against the blocking piece for temporarily retaining the oil between the crystals 5, as shown by a left arrow in FIG. 25. The oil retention property of the surface layer 3 is enhanced also by such blocking piece 11.

Figure 26:
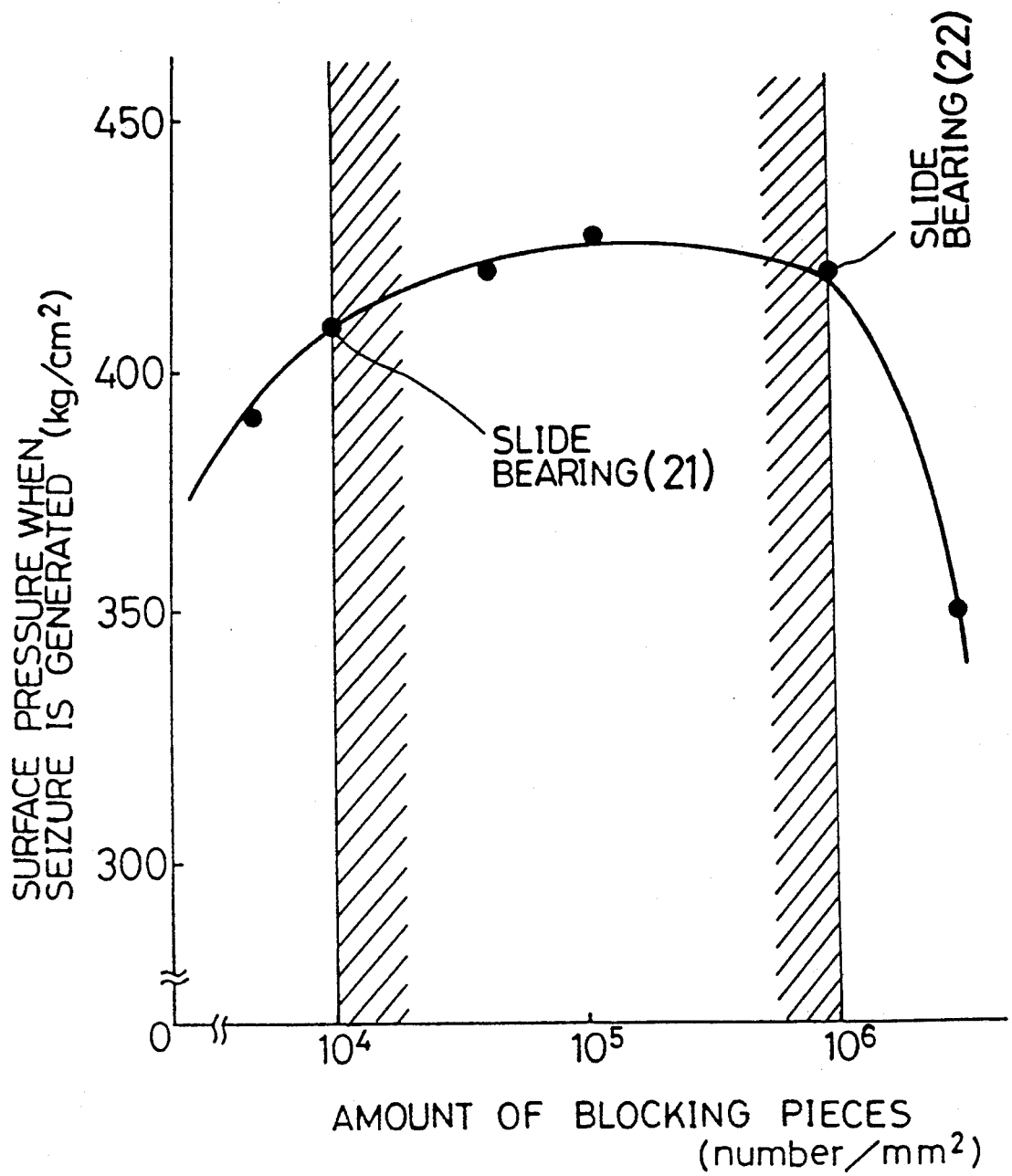
FIG. 26 is a graph illustrating a relationship between the amount of blocking pieces present and the surface pressure at the generation of seizure.

FIG. 26 illustrates a relationship between the amount of blocking pieces 11 which are present and the surface pressure when seizure is generated. The seizure test were carried out in the same manner and under the same conditions as those described above.

As apparent from FIG. 26, the amount E of blocking pieces 11 is preferably in a range of $10^4/mm^2 \leq E \leq 10^6/mm^2$. If the amount E is less than $10^4/mm^2$ ($E \leq 10^4/mm^2$), an oil retention property improving effect is deteriorated by the blocking pieces 11. But if the amount E is more than $10^4/mm^2$ ($E \leq 10^6/mm^2$), the flow of oil is obstructed by the blocking pieces 11, resulting in a reduced oil-cooling property.

As in the first embodiment, the orientation index Oe in the (200) and (400) planes and thus in the (h00) plane of the Pb alloy crystal is 100%. Hence, the Pb alloy crystal has a crystal face, i.e., a (h00) plane, oriented in each of the directions of crystallographic axes a, b and c.

Table 7 illustrates the comparison of various slide bearings (19) to (22), (17) and (18) in composition of the surface layer and properties of the slide surface. The surface layer of the slide bearing (19) which is an example of the present invention is formed from the Pb alloy shown in FIG. 20. The seizure tests were carried out in the same manner and under the same conditions as those described above.

TABLE 7

| Slide Bearing | Che. Constituent (% by weight) | | | Crystal | | | | | |
|---|---|---|---|---|---|---|---|---|---|
| | Sn | Cu | Pb | Oe (%) | Form | Amount D (N/mm²) | Amount E (N/mm²) | Den. (A/dm²) | Density (A/dm²) |
| (19) | 8 | 2 | Balance | 100 | Qua. | 3.2 × 10⁵ | — | 8 | 420 |
| (20) | 8 | 2 | Balance | 100 | Qua. | 10⁵ | — | 6 | 410 |
| (21) | 8 | 2 | Balance | 100 | Qua. | — | 10⁴ | 20 | 410 |
| (22) | 10.5 | 2.5 | Balance | 100 | Qua. | — | 10⁴ | 12 | 420 |
| (17) | 8 | 2 | Balance | 23.2 | Gra. | — | — | — | 190 |

TABLE 7-continued

| Slide Bearing | Che. Constituent (% by weight) | | | Crystal | | | | | |
|---|---|---|---|---|---|---|---|---|---|
| | Sn | Cu | Pb | Oe (%) | Form | Amount D (N/mm$^2$) | Amount E (N/mm$^2$) | Den. (A/dm$^2$) | Density (A/dm$^2$) |
| (18) | 10 | 2.5 | Balance | 50.2 | Gra. | — | — | — | 210 |

Chem = Chemical
Oe = Oe in (h00) plane
Form = Crystal form
Amount D = Amount in quadrangular pyramid-shaped crystals having projection piece
Amount E = Amount of blocking pieces
N/mm$^2$ = Number/mm$^2$
Den. = Cathode current density
Su. Pre. = Surface pressure when seizure is generated
Qua. = Quadrangular pyramid-shaped
Gra. = Granular As apparent from Table 7, the slide bearings (19) to (22) as the examples of the present invention each has an excellent seizure resistance, as compared with the slide bearings (17) and (18) as comparative examples. The slide bearings (19) and (20), as the examples of the present invention, are shown in FIG. 24, and the slide bearings (21) and (22), as examples of the present invention, are shown in FIG. 26.

Figure 27:
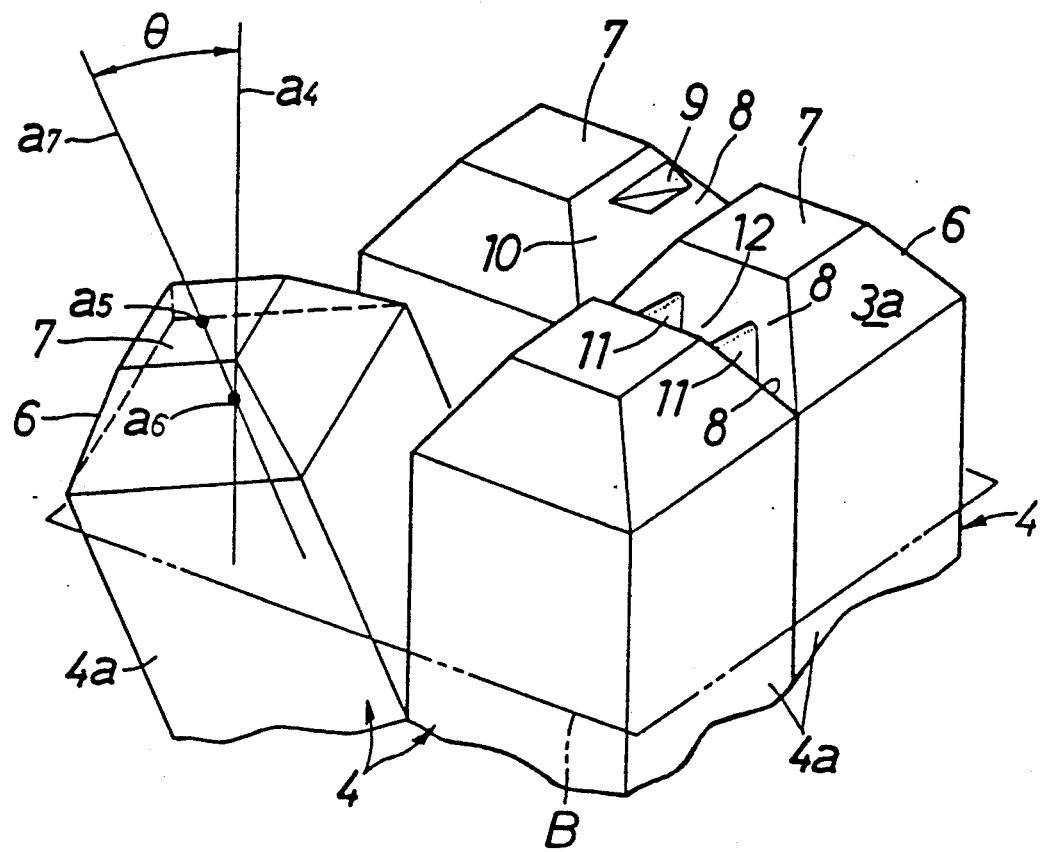
FIG. 27 is a schematic perspective view of an essential portion of the surface layer.
Figure 28:
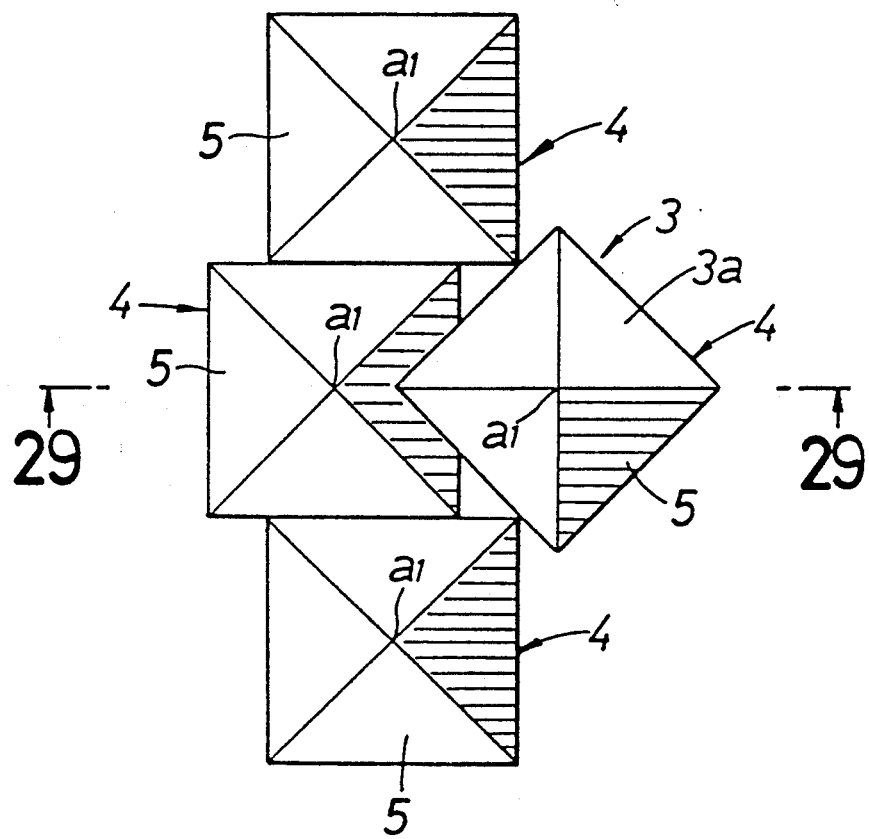
FIG. 28 is a schematic plan view of an essential portion of the surface layer.
Figure 29:
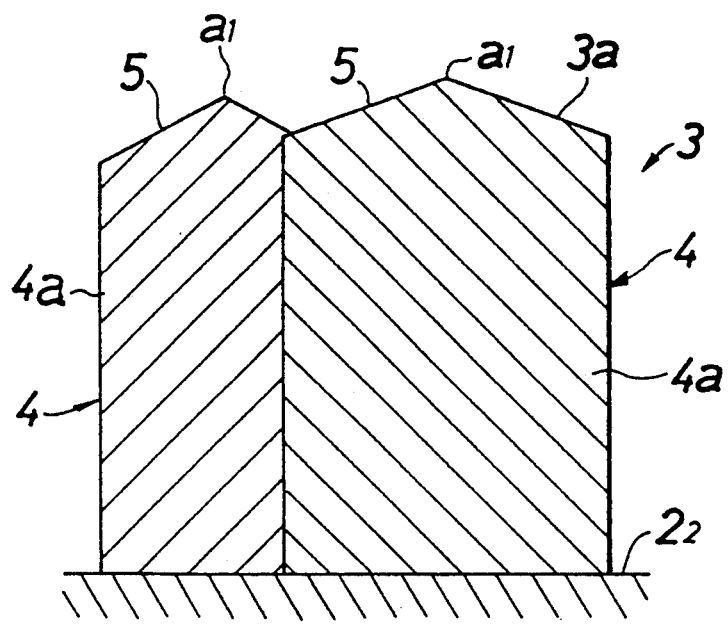
FIG. 29 is a sectional view taken along a line 29—29 in FIG. 28.

As shown in FIG. 27, the present invention embraces slide bearings in which a surface layer 3 made of Pb alloy has only a plurality of truncated-pyramid-shaped projections, e.g., truncated-quadrangular pyramid-shaped crystals 6, in the illustrated embodiment with their upper base faces directed so as to define a slide surface 3a in cooperation, as well as slide bearings in which the surface layer 3 made of a Pb alloy has quadrangular pyramid-shaped crystals 5 and truncated-quadrangular pyramid-shaped crystals 6 in combination. In these cases, a slide characteristic similar to that described above can be obtained. With such configuration, at least a portion of the slide surface 3a is formed from upper base faces 7 of the truncated-quadrangular pyramid-shaped crystals 6. This ensures that an oil film can be formed between a mating member and the upper base faces 7 to provide an improvement in initial conformability and stabilization of the sliding.

A slide bearing with a portion of a slide surface 3a formed by quadrangular pyramid-shaped crystals 5 and/or truncated-quadrangular pyramid-shaped crystals 6 are also included in the present invention. In this case, the percent area A of the quadrangular pyramid-shaped crystals 5 in the slide surface 3a is set at A≧50%, as in the first embodiment, and the inclination angle θ of the quadrangular pyramid-shaped crystals 5 and truncated-quadrangular pyramid-shaped crystals 6 is set at 0°≦θ≦30°, as in the first embodiment (see FIGS. 22 and 27).

FIGS. 28 to 33 illustrate a third embodiment of the present invention.

As shown in FIGS. 3, 5, 6, 28 and 29, adjacent columnar crystals 4 grew in a surface layer 3 in such the manner that one bites into the other. Therefore, in the slide surface 3a, one of adjacent quadrangular pyramid-shaped crystals 5 bites into the other.

If biting occurs between the columnar crystals 4 in this manner, both the columnar crystals 4 in a bitten state have an increased internal stress leading to a high hardness, thereby assuring an increased wear resistance of the surface layer 3.

Table 8 illustrates the comparison of various slide bearings (23) to (26), (17) and (18) in composition of the surface layer, crystal structure and the like. In Table 8, the biting rate G was found according to $G = (F_2/F_1) \times 100$ wherein $F_1$ is the total number of quadrangular pyramid-shaped crystals, and $F_2$ is the number of quadrangular pyramid-shaped crystals in a bitten state. For example, $F_1$ is "4" and $F_2$ is "2" in FIG. 28.

TABLE 8

| Slide Bearing | Che. Constituent (% by weight) | | | Crystal Structure | | Density (A/dm$^2$) |
|---|---|---|---|---|---|---|
| | Sn | Cu | Pb | Oe (%) | Biting rate (%) | |
| (23) | 8 | 2 | Balance | 100 | 10–30 | 3 |
| (24) | 8 | 2 | Balance | 100 | 30–60 | 6 |
| (25) | 8 | 2 | Balance | 100 | 60–80 | 8 |
| (26) | 10.5 | 2.5 | Balance | 100 | 80≦ | 16 |
| (17) | 8 | 2 | Balance | 23.2 | Aggregate | — |
| (18) | 10 | 2.5 | Balance | 50.2 | Aggregate | — |

Oe = Oe in (h00) plane
Density = Cathode current density
Aggregate = Aggregate of granular crystals It can be seen from Table 8 that the biting rate G is increased as the cathode current density is increased.

Figure 30:
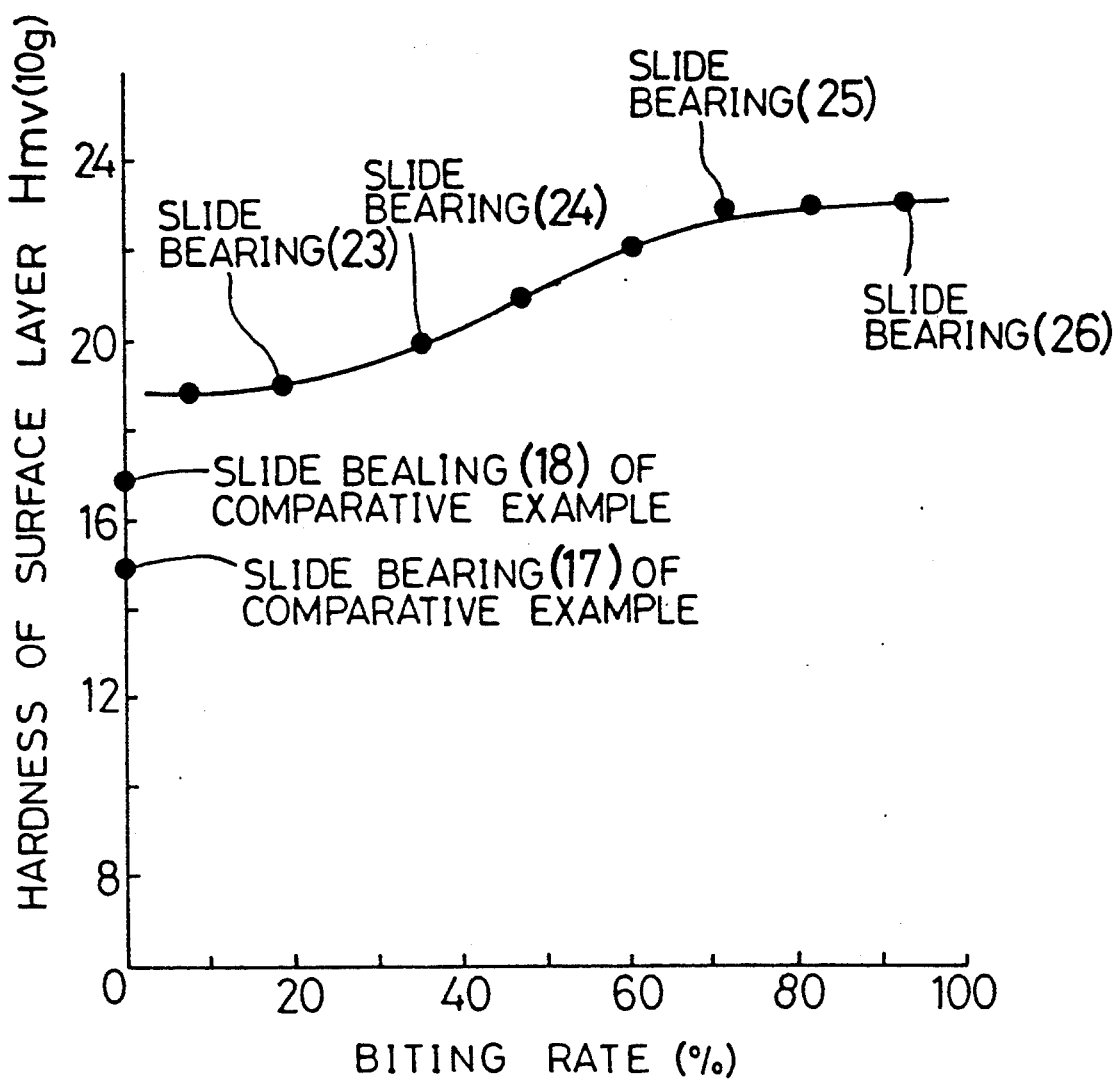
FIG. 30 is a graph illustrating a relationship between the biting rate and the hardness of the surface layer.

FIG. 30 illustrates a relationship between the biting rate G and the hardness Hmv of the surface layer 3 in the slide bearings (23) to (26), as examples of the present invention, and the slide bearings (17) and (18), as the comparative examples. The hardness Hmv was measured by using Micro Vickers hardness micrometer at a load of 10 g in a longitudinal section of the surface layer 3 from a direction perpendicular to such longitudinal section.

As apparent from FIG. 30, it can be seen that in the slide bearings (23) to (26) as examples of the present invention, the hardness Hmv of the surface layer 3 is increased as the biting rate G is increased, and the hardness Hmv is higher than that of the slide bearings (17) and (18) as the comparative examples. This is attributable to the hardness of the surface layer 3 being increased because of the biting of the columnar crystal 4 and the orientation index Oe of 100% in the (h00) plane.

Figure 31:
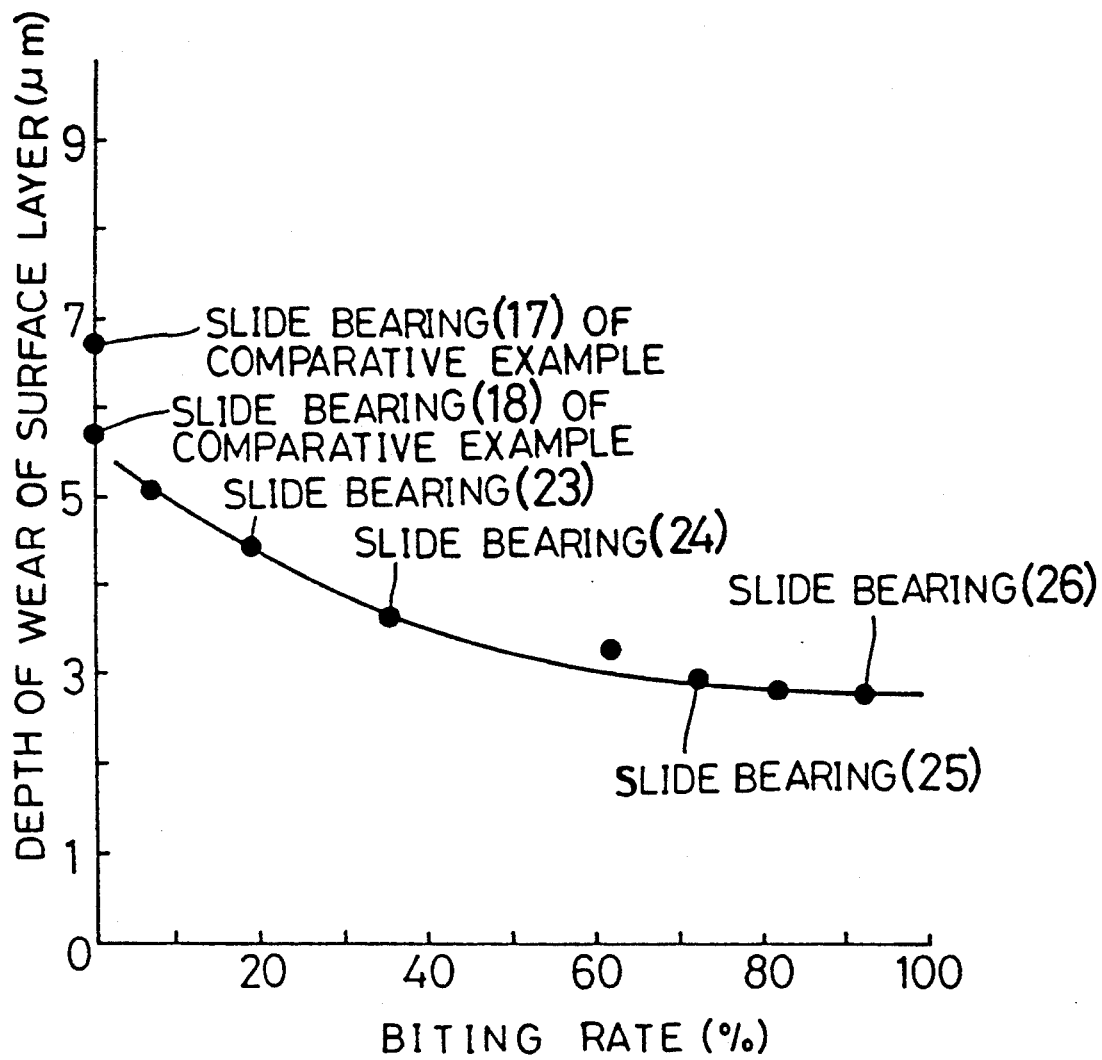
FIG. 31 is a graph illustrating a relationship between the biting rate and the depth of wear of the surface layer.

FIG. 31 illustrates results of wear tests for the slide bearings (23) to (26) as examples of the present invention and the slide bearings (17) and (18) as the comparative examples.

The wear tests were carried out for a given sliding distance by bringing each of the slide bearings into slide contact with a rotary shaft, with a load on the slide bearing being a dynamic load of a sinusoidal entire wave type synchronized with the rotary shaft.

The test conditions were as follows: the material used for a rotary shaft was a nitrided JIS S48C material; the number of revolutions of the rotary shaft was 3,000 rpm; the maximum surface pressure applied was 600 kg/cm$^2$ (projected area of bearing: width×diameter);

the sliding distance was $2.5 \times 10^3$ km; the oil supply temperature was 120° C.; and the oil supply pressure was 3 kg/cm².

As apparent from FIG. 31, the slide bearings (23) to (26), as examples of the present invention, each have an excellent wear resistance, as compared with the slide bearings (17) and (18), as the comparative examples. In the slide bearings (23) to (26), as examples of the present invention, the wear resistance is increased as the biting rate G is increased, but a preferable range of the biting rate G is $80 \leq G \leq 100\%$.

Figure 32:
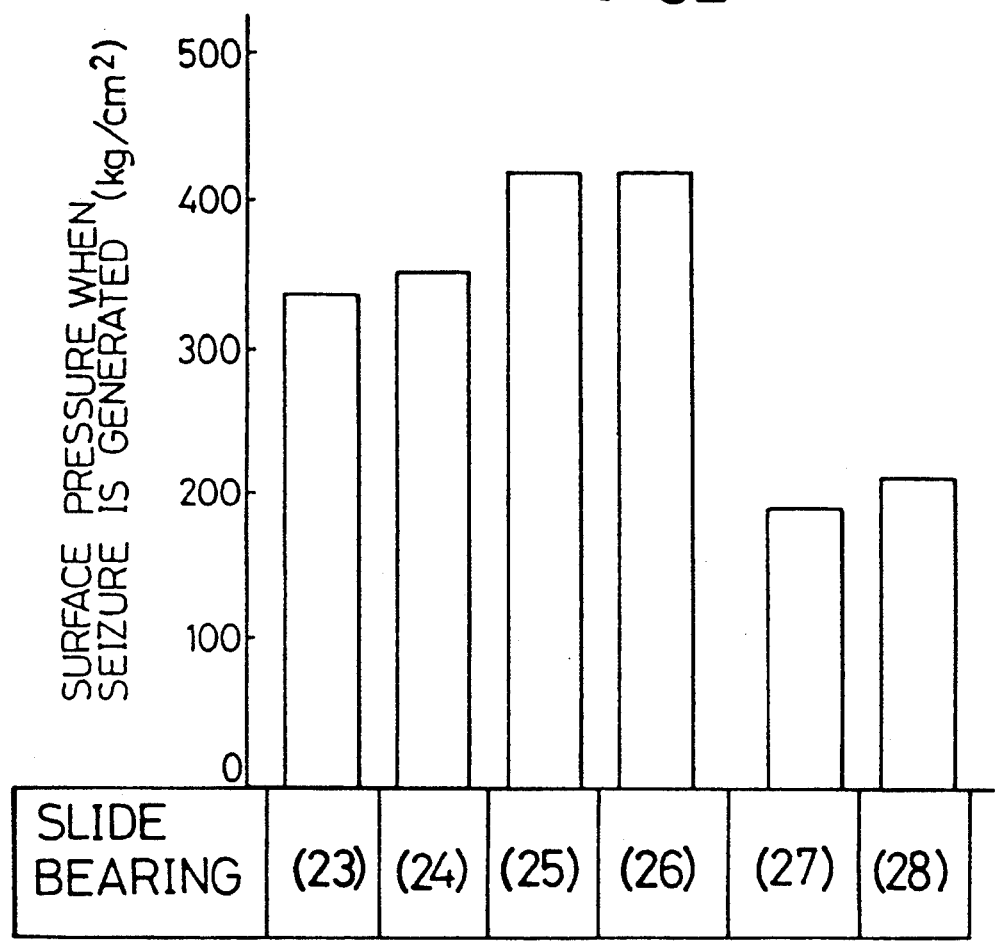
FIG. 32 is a graph illustrating results of a seizure test.

FIG. 32 illustrates results of seizure tests for the slide bearings (23) to (26), as examples of the present invention, and the slide bearings (17) and (18), as the comparative examples.

The seizure tests were carried out by bringing each of the slide bearings into slide contact with a rotary shaft and increasing the load applied to the slide bearing. FIG. 32 shows the surface pressure determined when a seizure is produced in the surface layer of the slide bearing.

The test conditions were as follows: The material used for a rotary shaft was a nitrided JIS S48C material; the number of revolutions of the rotary shaft was 6,000 rpm; the oil supply temperature was 120° C.; the oil supply pressure was 3 kg/cm²; and the applied load rate was 1 kg/sec.

It can be seen from FIG. 32 that the slide bearings (23) to (26), as examples of the present invention, each have an excellent seizure resistance, as compared with the slide bearings (17) and (18), as the comparative examples.

Figure 33:
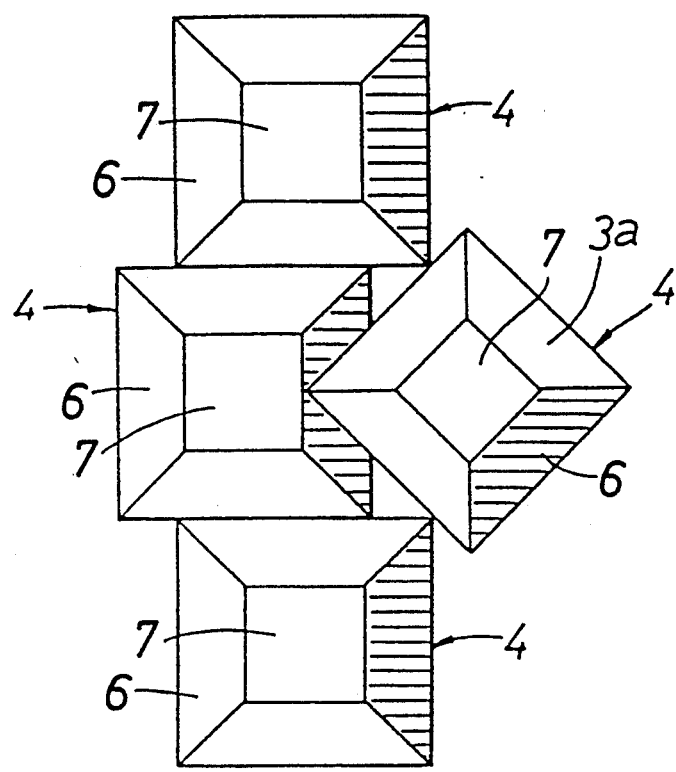
FIG. 33 is a schematic plan view of an essential portion of the surface layer.

FIG. 33 is similar to FIG. 18 and illustrates a slide bearing in which a surface layer 3 has a plurality of pyramid-shaped projections, e.g., truncated-quadrangular pyramid-shaped crystals 6, of a Pb alloy with upper base faces 7 thereof directed so as to form the slide surface 3a in cooperation. A slide characteristic similar to that described above can be obtained even with such crystals 6, or with combined structure comprising the truncated-quadrangular pyramid-shaped crystals 6 and quadrangular pyramid-shaped crystals 5.

A slide bearing having its slide surface 3a partly formed by quadrangular pyramid-shaped crystals 5 and/or truncated-quadrangular pyramid-shaped crystals 6 is also included in the present invention. In this case, the percent area A of the quadrangular pyramid-shaped crystals 5 or the like in the slide surface 3a is set in a range of $A \geq 50\%$, and the inclination angle $\theta$ of the quadrangular pyramid-shaped crystals 5 and the truncated-quadrangular pyramid-shaped crystals 6 is set in a range of $0 \leq \theta \leq 30°$, as in the first embodiment.

FIGS. 34 to 40 illustrate a fourth embodiment of the present invention.

Figure 34:
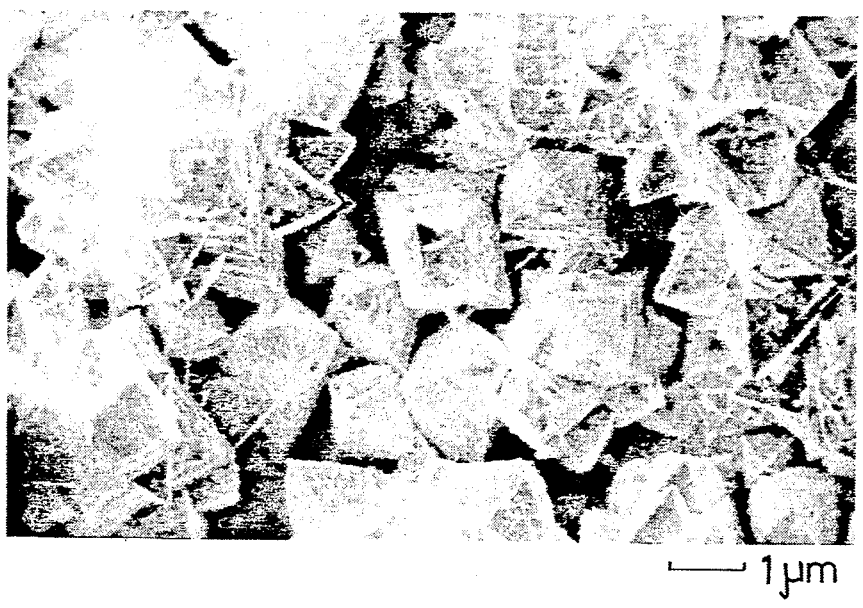
FIG. 34 is a microphotograph showing a crystal structure of a Pb alloy in a slide surface.

FIG. 34 is an electronic microphotograph (10,000×magnification) showing a crystal structure of Pb alloy in a slide surface 3a. A surface layer 3 is made of Pb alloy containing 8% by weight of Sn and 2% by weight of Cu. The surface layer 3 is formed on a lining layer $2_2$ of Cu alloy, and in forming the surface layer 3, the cathode current density in an electroplating process was set at 10 A/dm².

Figure 35:
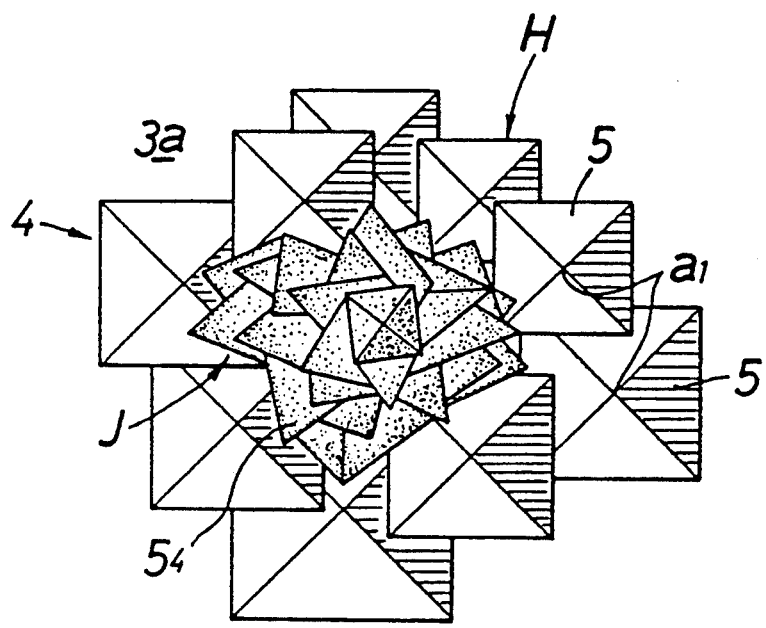
FIG. 35 is a schematic plan view of an essential portion of the slide surface.

As clearly shown in FIGS. 34 and 35, the surface layer 3 includes a matrix H forming the slide surface 3a, the massive portions J dispersed in the matrix H. The matrix H comprises an aggregate of pyramid-shaped projections, e.g., quadrangular pyramid-shaped crystals 5 in the illustrated embodiment with their apexes a1 directed toward the slide surface 3a. Each quadrangular pyramid-shaped crystal 5 forms a tip end of a columnar crystal 4 extending from the lining layer $2_2$. Each massive portion J is provided at a surface thereof with substantially radiately extending pyramid-shaped projections, e.g., quadrangular pyramid-shaped crystals $5_4$ in the illustrated embodiment, and is obtained as a result of a deformation of the tip end of the columnar crystal 4. The percent area $A_1$ of the massive portions J in the matrix H is preferably $5\% \leq A_1 \leq 50\%$, and $A_1 = 50\%$ in the example of FIG. 34.

The orientation index Oe in the (200) and (400) planes and thus in the (h00) plane of the Pb alloy crystals forming the matrix H is 100% as in the first embodiment. Thus, the Pb alloy crystals each have a crystal face oriented in each of directions of crystallographic axes a, b and c, i.e., the (h00) plane.

Figure 36:
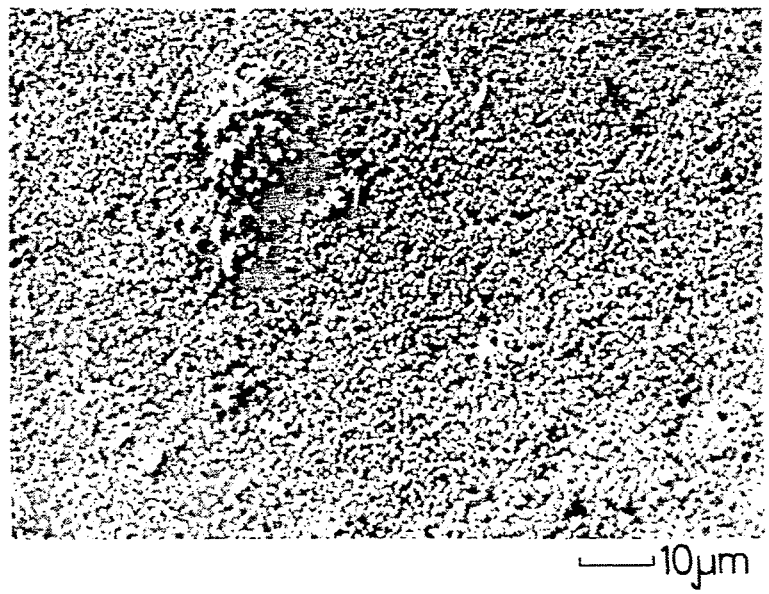
FIG. 36 is a microphotograph showing a crystal structure of a Pb alloy in a slide surface.
Figure 37:
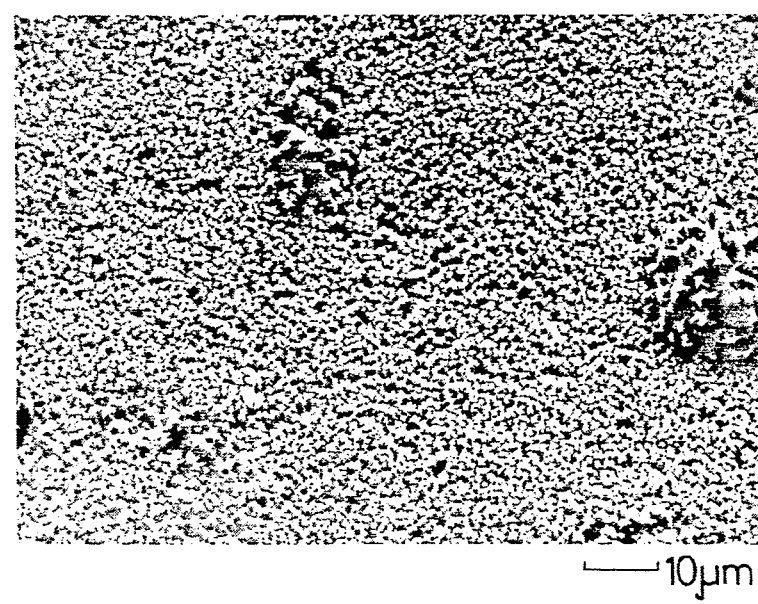
FIG. 37 is a microphotograph showing a crystal structure of a Pb alloy in a slide surface.

Each of FIGS. 36 and 37 are a microphotograph (1,000×magnification) showing a crystal structure of a Pb alloy in another surface 3a. In FIG. 36, the percent area A1 of the massive portions J in the slide surface 3a is 10% ($A_1 = 10\%$), and in FIG. 37, the percent area $A_1$ of the massive portions J in the slide surface 3a is equal to 30% ($A_1$ 30%).

Figure 38:
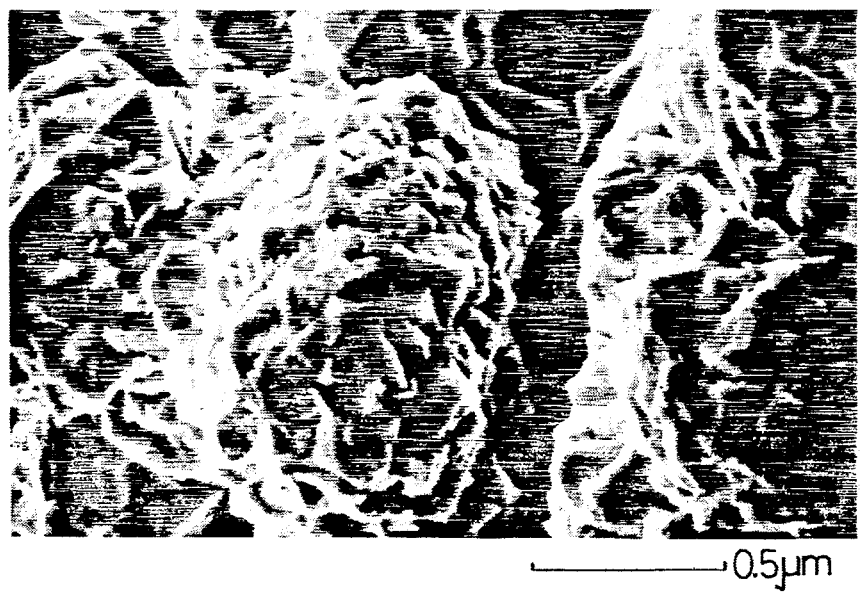
FIG. 38 is a microphotograph showing a crystal structure of a Pb alloy in a slide surface.

FIG. 38 is a microphotograph (5,000×magnification) showing a crystal structure of a Pb alloy in a further slide surface 3a. The entire slide surface 3a is formed from massive portions J. Therefore, the percent area $A_1$ of the massive portions J in the slide surface 3a is 100% ($A_1 = 100\%$).

Table 9 shows the comparison of various slide bearings (27) to (30), (17) and (18) in composition of the surface layer, orientation index Oe in the (h00) plane of the matrix H, crystal form, and the like.

TABLE 9

| Slide Bearing | Che. Constituent (% by weight) | | | Matrix | | Area (%) | Density (A/dm²) |
|---|---|---|---|---|---|---|---|
| | Sn | Cu | Pb | Oe (%) | Form | | |
| (27) | 8 | 2 | Balance | 100 | Qudra. | 10 | 6 |
| (28) | 8 | 2 | Balance | 100 | Qudra. | 30 | 8 |
| (29) | 8 | 2 | Balance | 100 | Qudra. | 50 | 10 |
| (30) | 10.5 | 2.5 | Balance | — | — | 100 | 15 |
| (17) | 8 | 2 | Balance | 23.2 | Granu. | — | — |
| (18) | 10 | 2.5 | Balance | 50.2 | Granu. | — | — |

Oe = Oe in (h00) plane
Form = Crystal form
Area = Area of massive portions
Density = Cathode current density
Qudra. = Quadrangular pyramid-shaped
Granu. = Granular The slide bearing (27), as the example of the present invention, includes the Pb alloy portion shown in FIG. 36; the slide bearing (28), as the example of the present invention, includes the Pb alloy portion shown in FIG. 37; the slide bearing (29), as the example of the present invention, includes the Pb alloy portion shown in FIG. 34; and the slide bearing (30), as the example of the present invention, includes the Pb alloy portion shown in FIG. 38. As apparent from Table 9, the amount of massive portions J produced is increased, as the cathode current density is increased.

Figure 39:
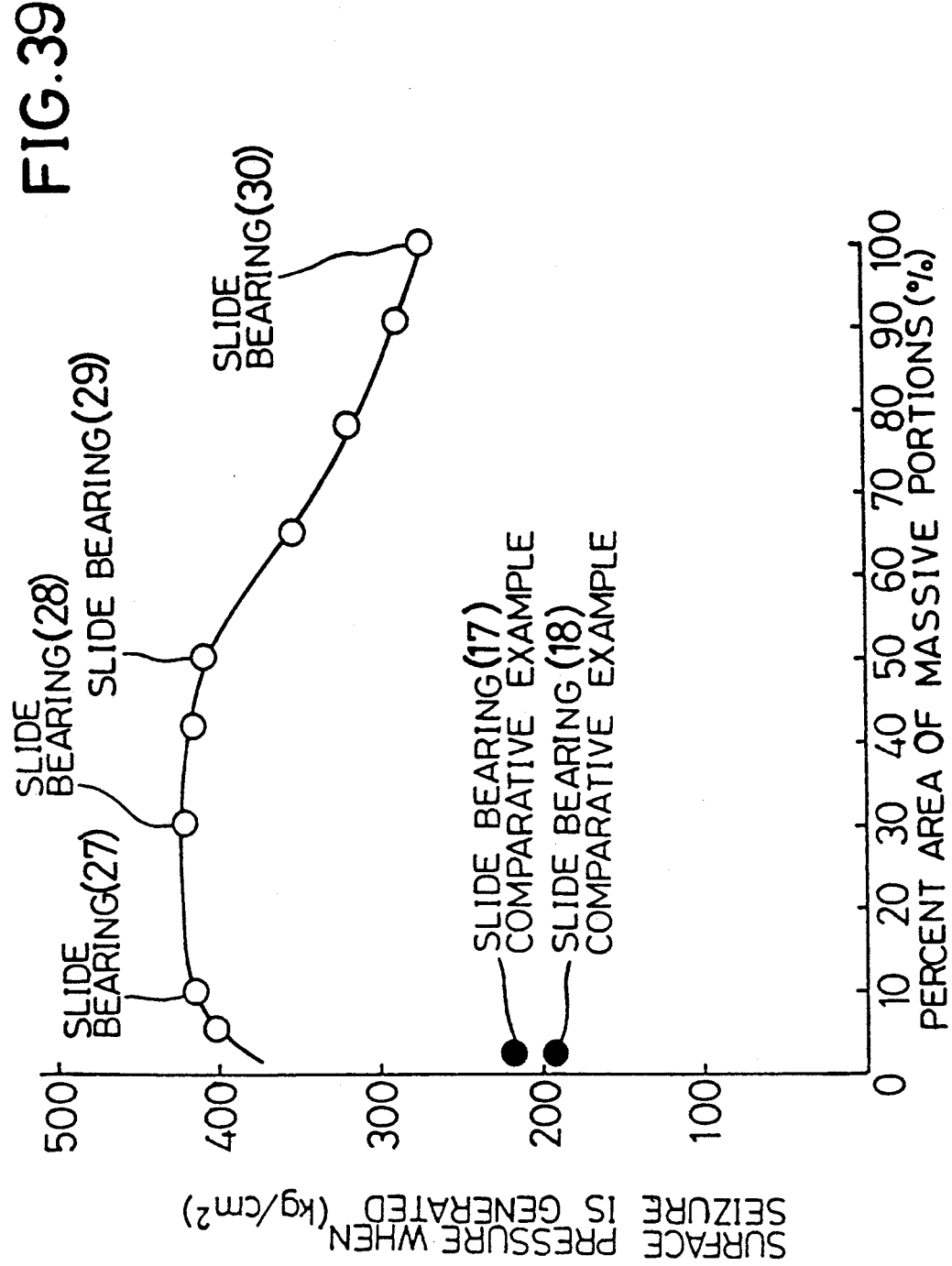
FIG. 39 is a graph illustrating a relationship between the percent area of massive portions and the surface pressure when seizure is generated.

FIG. 39 illustrates results of seizure tests for the slide bearings (27) to (30), as the examples of the present invention, and the slide bearings (17) and (18), as comparative examples.

The seizure tests were carried out by bringing each of slide bearings into slide contact with a rotary shaft and gradually increasing the load applied to the slide bearing. FIG. 39 illustrates the surface pressure determined when a seizure is produced in the surface layer of each of the slide bearings.

The test conditions were as follows: the material used for a rotary shaft was a nitrided JIS S48C material; the number of revolutions of the rotary shaft was 6,000 rpm; the oil supply temperature was 120° C.; the oil supply pressure was 3 kg/cm$^2$; and the applied load was 1 kg/sec.

As apparent from FIG. 39, the slide bearings (27) and (30), as the examples of the present invention, each have an excellent seizure resistance, as compared with the slide bearings (17) and (18), as comparative examples. This is because in each of the slide bearings (27) and (30), as the examples of the present invention, the surface area of the slide surface 3a is increased to give a sufficient oil retention property to the surface layer 3, as the matrix H of the slide surface 3a is formed from the quadrangular pyramid-shaped crystals 5 and each massive portion J is provided at the surface thereof with the quadrangular pyramid-shaped crystal $5_4$. However, if the percent area $A_1$ of the massive portions J is less than 5% ($A_1 \leq 5\%$), the surface area increasing effect for the slide surface 3a is reduced. However, if $A_1 \geq 50\%$, the massive portions J may be coalesced and hence, the percent area $A_1$ having such a large value is not preferred for maintaining the strength of the surface layer 3. Even with the slide bearing (30) as the example of the present invention, the effect of improving the oil retention property of the surface layer 3 can be likewise provided by the massive portions J. However, when the matrix is formed of granular crystals of Pb alloy and the massive portions J are dispersed therein, the effect of improving the oil retention property of the surface layer 3 cannot be obtained, if the percent area $A_1$ of the massive portions J is less than 5% ($A_1 \leq 5\%$).

Figure 40:
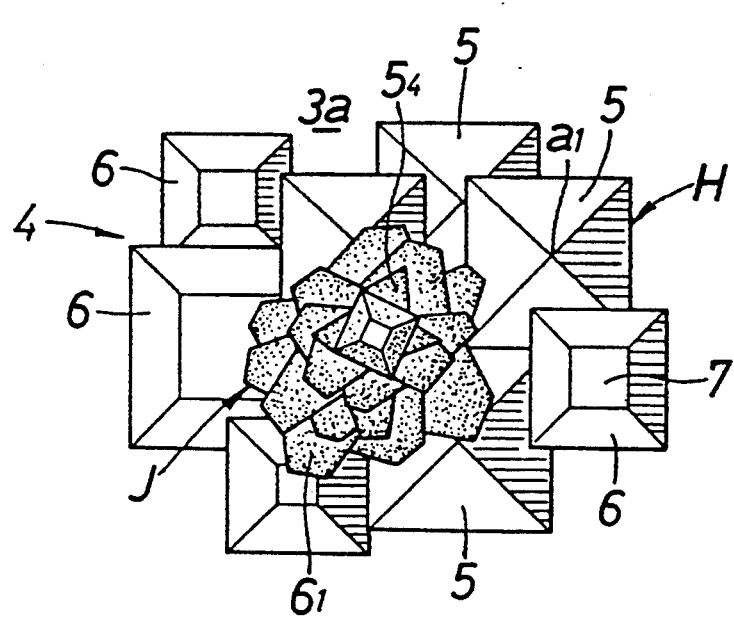
FIG. 40 is a schematic plan view of an essential portion of the slide surface.

The present invention also includes a slide bearing in which a matrix H is comprised of only truncated-quadrangular pyramid-shaped crystals (truncated-pyramid-shaped projections) 6 with their upper base faces 7 directed toward a slide surface 3a, as shown in FIG. 18, as well as a slide bearing in which a matrix H is comprised of a combination of quadrangular pyramid-shaped crystals 5 and truncated-quadrangular pyramid-shaped crystals 6, as shown in FIG. 40. Additionally, the present invention includes a slide bearing in which the massive portion J has only truncated-quadrangular pyramid-shaped crystals $6_1$ (truncated-pyramid-shaped projections) on its surface, as well as a slide bearing in which the massive portion J has quadrangular pyramid-shaped crystal $5_4$ and a truncated-quadrangular pyramid-shaped crystal $6_1$ in combination on its surface thereof, as shown in FIG. 40.

Further, also included in the present invention is a slide bearing in which complex regions which are each comprised of a matrix H and a massive portion J form a portion of a slide surface 3a, i.e., the complex regions are present in a dispersed state. In this case, the percent area $A_3$ of the complex region in the slide surface 3a is set in a range of $A_3 \geq 50\%$. In addition, the inclination angle $\theta$ of quadrangular pyramid-shaped crystals 5 and truncated-quadrangular pyramid-shaped crystals 6 in the matrix H is set in a range of $0° \leq \theta \leq 30°$, as in the first embodiment.

FIGS. 41 to 44 illustrate a fifth embodiment of the present invention.

Figure 41:
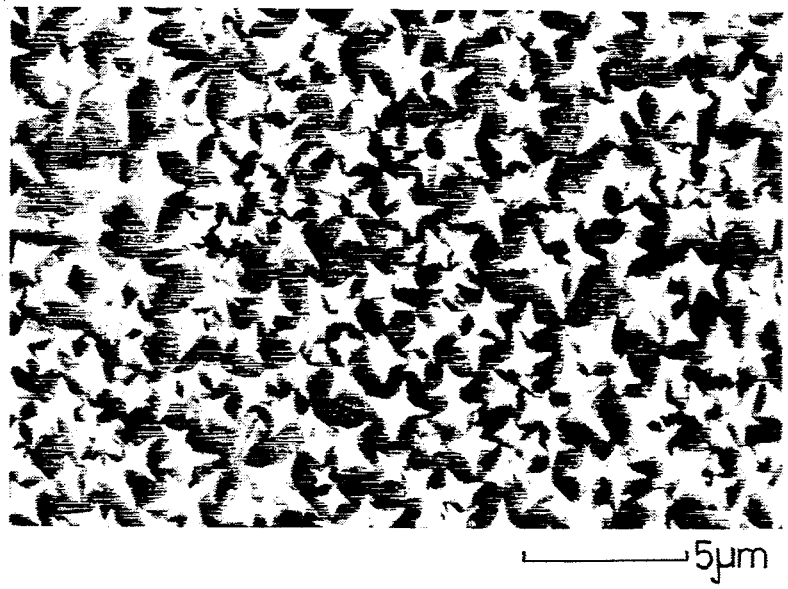
FIG. 41 is a microphotograph showing a crystal structure of a Pb alloy in a slide surface.
Figure 42:
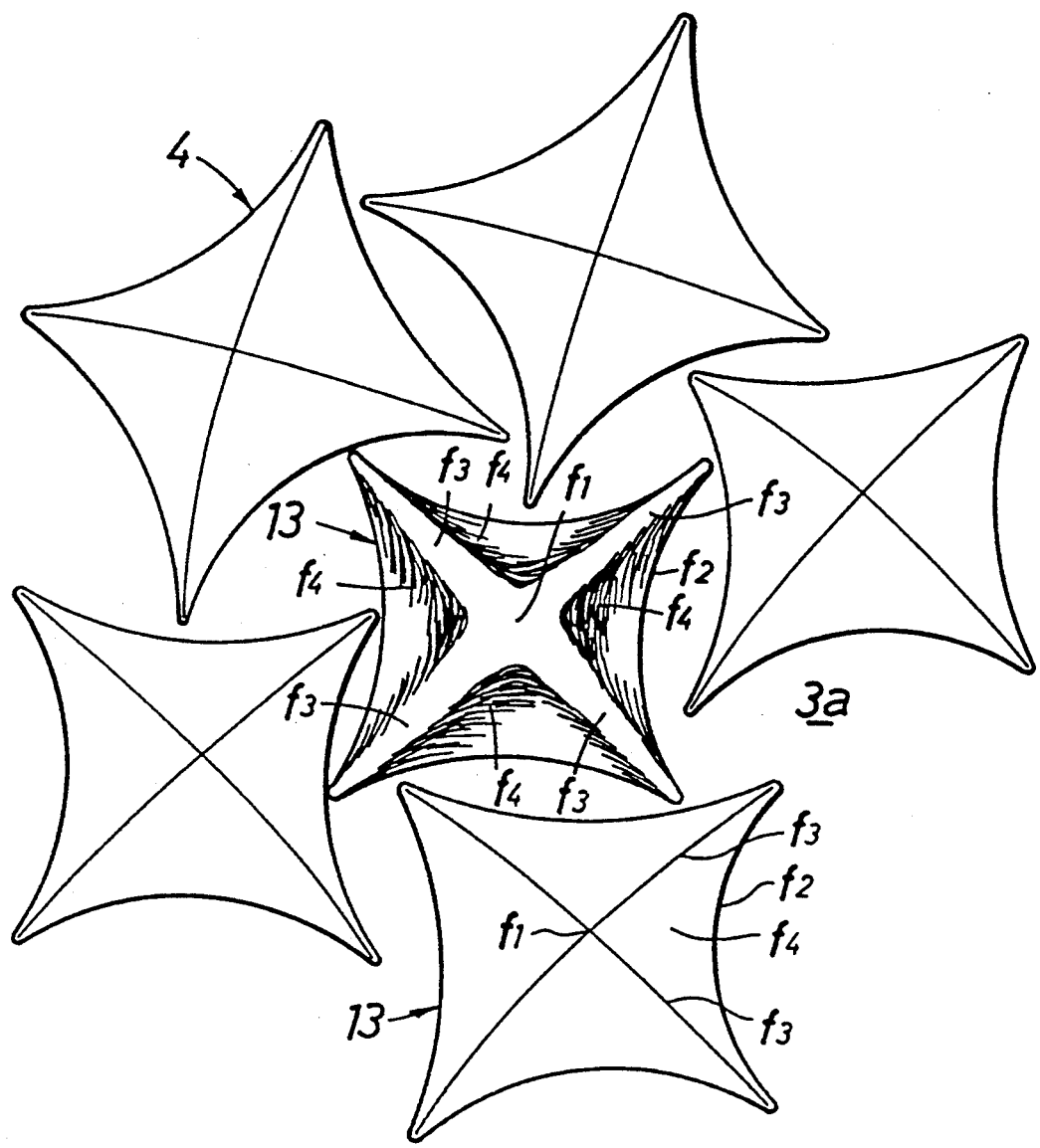
FIG. 42 is a schematic plan view of an essential portion of the slide surface.

FIG. 41 is an electronic microphotograph (10,000× magnification) showing a crystal structure of a Pb alloy in a slide surface 3a of a surface layer 3. The slide surface 3a was formed by subjecting the surface of a plated layer having a structure similar to those in FIGS. 3 and 5 to 7 to an electro-etching process. In this electro-etching process, the etching solution used was an aqueous solution of 20 to 100 g of borofluoric acid per liter of water, and the plated layer was connected to plus (+) side. The resulting surface layer 3 has a plurality of angle projections 13 forming the slide surface 3a, as also shown in FIG. 42. Each angle projection 13 is formed into a substantially star-like shape having a plurality of, e.g., four (in the illustrated embodiment) ridgeline portions $f_3$ extending from an apex $f_1$ toward a base portion $f_2$, with slants $f_4$ between adjacent ridgeline portions $f_3$ being recessed. In this example, the percent area $A_4$ of the angle projections 13 in the slide surface 3a is 100% ($A_4 = 100\%$).

The reason why such shape is obtained is as follows: In the quadrangular pyramid-shaped crystal 5 shown in FIG. 8, the concentration of alloy elements (Cu, Sn) in each of the ridgeline portions 14 becomes higher than in the slants 8 between adjacent ridgeline portions 14. This distribution of concentration of alloy elements is obtained from the fact that the current density in each of the ridgeline portions 14 becomes higher than that in each of the slants 8 due to an edge effect produced during an electro-plating process.

As the result, the metallographic structure becomes dense in each of the ridgeline portions 14, leading to an increased hardness of the ridgeline portion. Therefore, in the electro-etching process, the amount of each ridgeline portion 14 soluted is extremely small, while the amount of the slant 8 soluted is large and thus causing the slant 8 to be recessed largely. Thus, in the resulting angle projection 13, the hardness of the apex $f_1$ and the ridgeline portions $f_3$ becomes higher than that of the slants $f_4$.

If the slide surface 3a is formed of a plurality of angle projections 13 as described above, a suitable hardness can be given to the apex $f_1$ of each of the angle projections 13 and so, the apex $f_1$ can be preferentially worn moderately in use, thereby providing an improved initial conformability of the surface layer 3. In addition, due to each angle projection 13 having substantially star-like shape with the slants $f_4$ recessed, the surface area of the slide surface 3a is increased, thereby enabling the surface layer 3 to have a sufficient oil retention property.

When the preferential wearing of the apex $f_1$ is completed at an initial stage of the sliding movement and a flat face (which corresponds to an upper base face of a truncated-quadrangular pyramid) is formed, an oil film is always formed between such flat face and a mating member and therefore, the slide surface 3a will be worn extremely slowly thereafter.

Figure 43:
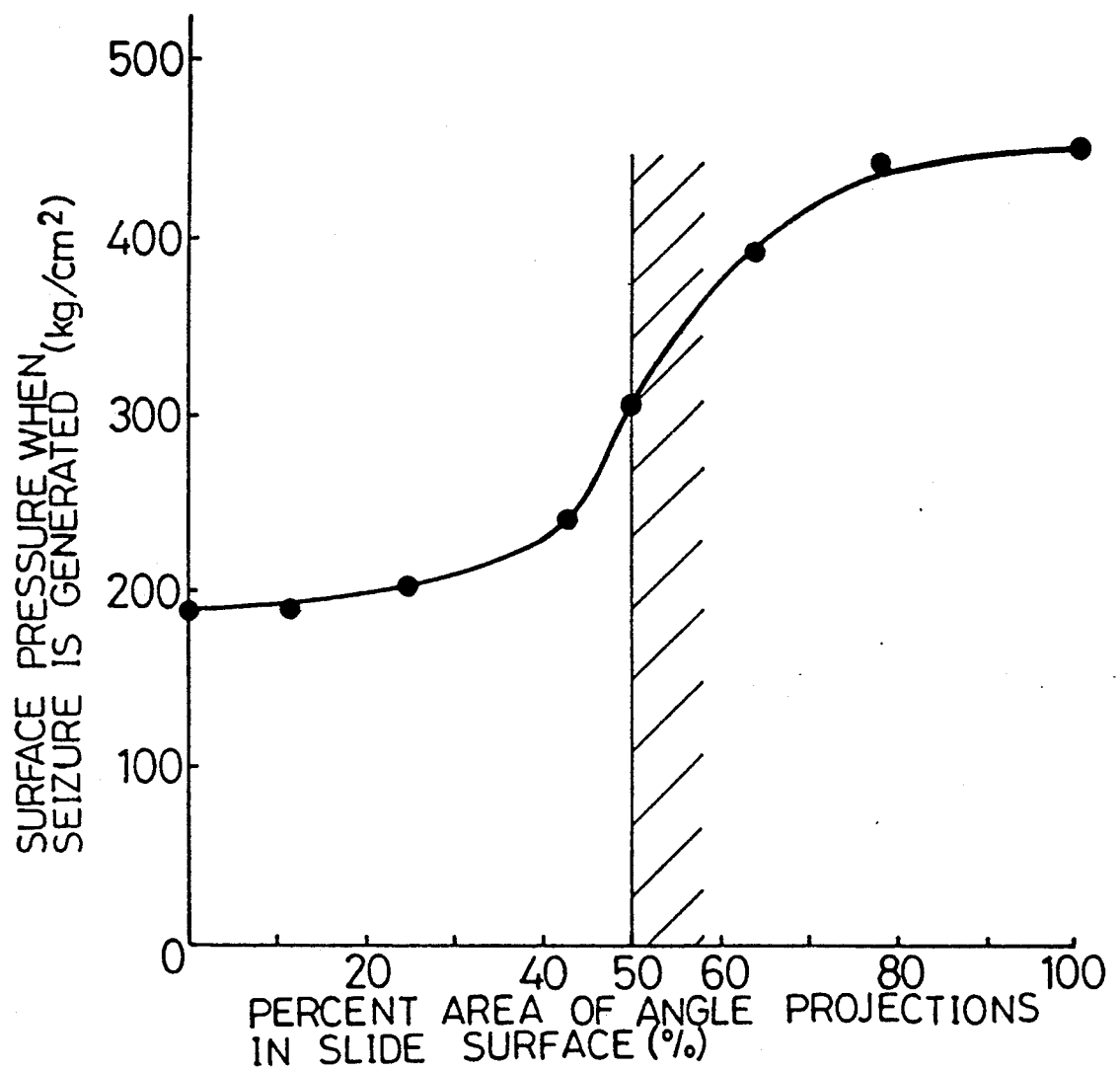
FIG. 43 is a graph illustrating a relationship between the percent area of angle projections in the slide surface and the surface pressure when seizure is generated.

FIG. 43 illustrates a relationship between the percent area $A_4$ of angle projections in the slide surface and the surface pressure at the generation of a seizure for the surface layers of various slide bearings. In FIG. 43, the slide surface with a percent area $A_4$ of 100% ($A_4 = 100\%$) corresponds to the slide surface according to the present invention which is shown in FIG. 41, and the slide surface with a percent area $A_4$ of 0% ($A_4 = 0\%$) corresponds to the slide surface in the prior art which is shown in FIGS. 14 and 15. The slide surface with a percent area $A_4$ smaller than 100% ($A_4 \leq 100\%$) includes quadrangular pyramid crystals 5, granular crystals, and the like, in addition to the angle projections 13.

The seizure tests were carried out by bringing each of the slide bearings into slide contact with a rotary shaft and increasing the load applied to the slide bearing. The values in FIG. 43 were determined when a seizure was produced in the surface layer of the slide bearing.

The test conditions were as follows: The material used for a rotary shaft was a nitrided JIS S48C material; the number of revolutions of the rotary shaft was 6,000 rpm; the oil supply temperature was 120° C.; the oil supply pressure was 3 kg/cm$_2$; and the applied load was 1 kg/sec.

As apparent from FIG. 43, the seizure resistance of the surface layer is increased, as the percent area $A_4$ of the angle projections 13 is increased. This is significant when the percent area $A_4 \geq 50\%$. The percent area $A_4$ of the angle projections 13 is preferably in a range of $A_4 \geq 80\%$.

Figure 44:
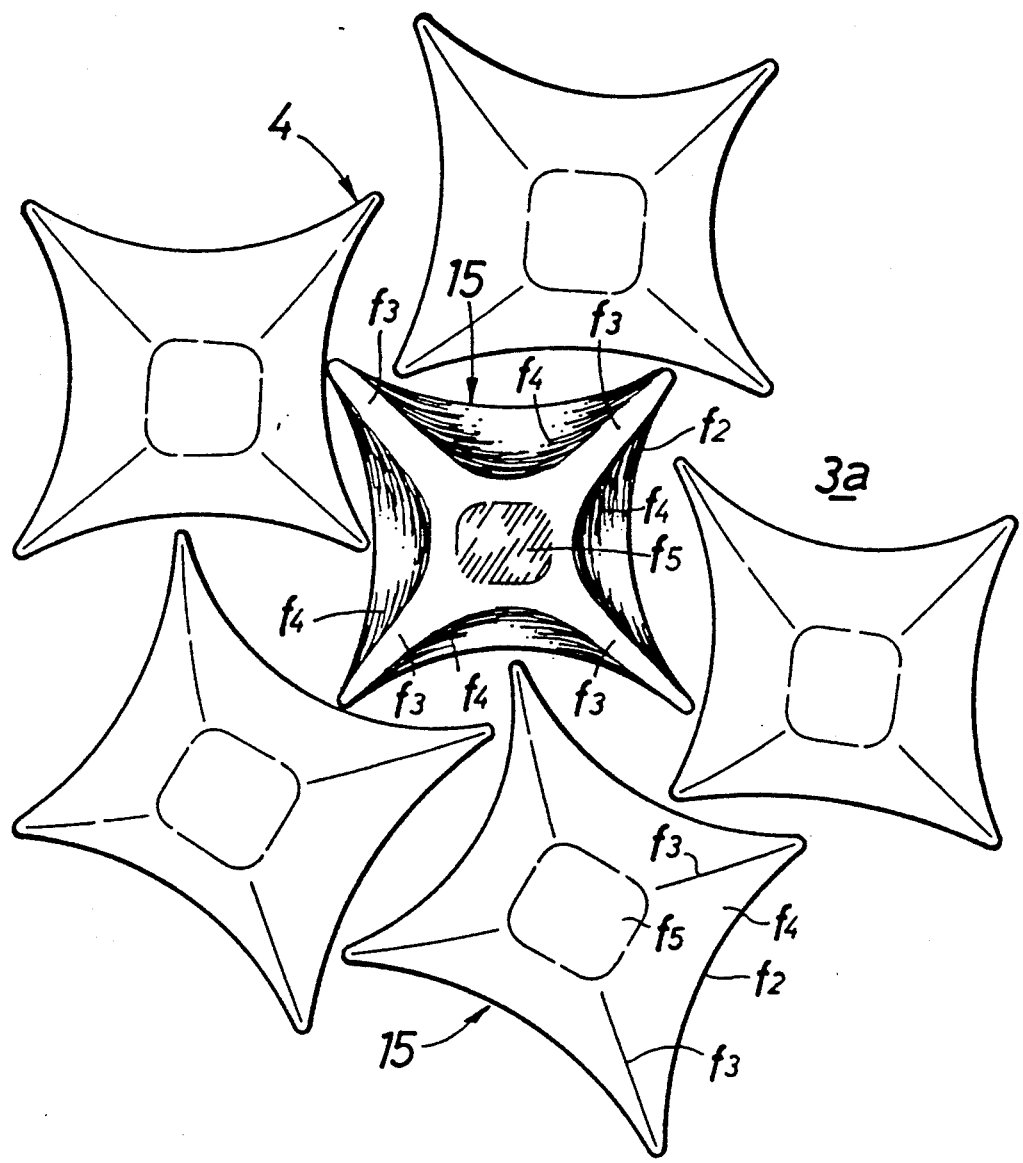
FIG. 44 is a schematic plan view of an essential portion of the slide surface.

FIG. 44 illustrates a surface layer 3 formed by subjecting a plated layer having a structure similar to that shown in FIG. 18 to an electro-etching process. In this case, a slide surface 3a is formed of angle projections 15 each having a flat apex portion f$_5$. A slide characteristic similar to that described above can be obtained even with this slide surface 3a formed of such angle projections 15 each having the flat apex portion, or with a combined structure comprising such angle projections 15 having the flat apex portions and angle projections 13 of the type described above. In the latter case, at least a portion of the slide surface 3a is formed of flat apex portions f$_5$ of the angle projections 15, which ensures that an oil film can be formed between a mating member and the apex portions f$_5$ from an initial stage of the sliding movement, thereby providing an improved initial conformability and stabilization of the sliding.

A slide bearing of which slide surface 3a is partly formed with angle projections 15 or with both of angle projections 13 and 15 is also included in the present invention. In this case, the percent area $A_4$ of the angle projections 13 and the like on the slide surface 3a is desirably in a range of $A_4 \geq 50\%$. The inclination angle of the angle projections 13, 15 and thus of the quadrangular pyramid-shaped crystals 5 and truncated-quadrangular pyramid-shaped crystals 6 is set at $0° \leq \theta \leq 30°$, as in the first embodiment.

Although the surface layer 3 has been formed by the electro-plating process in the above-described embodiments, other surface layer forming processes can be employed such as forming processes using a gas-phase, e.g., PVD, ion-plating, CVD, sputtering, etc. In forming pyramid-shaped projections 5 and the like on the slide surface 3a, it is possible to utilize etching processes such as chemical etching, electro-etching, gas-phase etching (bombardment treatment); transferring, machining such as cutting.

It will be understood that the present invention is not limited to the slide bearings and also applicable to other slide members.

What is claimed is:

1. A slide member comprising a surface layer having a slide surface for a mating member, wherein said surface layer has at least one group of: a plurality of pyramid-shaped projections; and a plurality of truncated pyramid-shaped projections which define said slide surface and protrude from a phantom plane extending along said slide surface;

a percent area A of said projections occupied in said slide surface is equal to more than 50% ($A \geq 50\%$);

when an inclination angle formed by a straight line passing an apex and a central portion of a base face of said pyramid-shaped projection or passing central portions of upper and lower base faces of said truncated pyramid-shaped projection with respond to a reference line perpendicular to said phantom plane is represented by $\theta$ the inclination angle $\theta$ of said projections is in a range of $0° \geq \theta \geq 30°$; and wherein said projections include ones which each have at least one protrusion piece around a base face thereof.

2. A slide member according to claim 1, wherein said projections include adjacent projections which are interconnected by a blocking piece.

3. A slide member according to claim 1, wherein said projections include adjacent projections of which one bites into another.

4. A slide member according to claim 2, wherein said adjacent projections include projections one of which bites into another.

5. A slide member according to claim 1, wherein said projections define respective tip ends of columnar crystals, and said columnar crystals include adjacent columnar crystals, one of the adjacent columnar crystals biting into another.

6. A slide member according to claim 3, wherein said projections define respective tip ends of columnar crystals, and said columnar crystals include adjacent columnar crystals, one of the adjacent columnar crystals biting into another.

7. A slide member comprising a surface layer having a slide surface for a mating member, wherein said surface layer has at least one group of: a plurality of pyramid-shaped projections each having an apex; and a plurality of truncated pyramid-shaped projections each having an upper base face, said apexes and said upper base faces of the projections being directed so as to define said slide surface, said projections including ones which are each provided with at least one protrusion piece around a base portion thereof.

8. A slide member comprising a surface layer having a slide surface for a mating member, wherein said surface layer has at least one group of: a plurality of pyramid-shaped projections each having an apex; and a plurality of truncated pyramid-shaped projections each having an upper base face, said apexes and said upper base faces of the projections being directed so as to define said slide surface, said projections including adjacent projections which are interconnected by a blocking piece.

* * * * *